United States Patent
Albisu et al.

(10) Patent No.: US 11,587,083 B2
(45) Date of Patent: Feb. 21, 2023

(54) TRANSACTION VALIDATION SERVICE

(71) Applicant: AT&T Intellectual Property I, L.P., Atlanta, GA (US)

(72) Inventors: Luis Albisu, Woodbridge, VA (US); Katie Alvarez, Denver, CO (US); Daniel Solero, Mooresville, IN (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 16/710,120

(22) Filed: Dec. 11, 2019

(65) Prior Publication Data

US 2021/0182851 A1    Jun. 17, 2021

(51) Int. Cl.
G06Q 20/40    (2012.01)
G06Q 20/32    (2012.01)
G06Q 20/38    (2012.01)

(52) U.S. Cl.
CPC ........ *G06Q 20/401* (2013.01); *G06Q 20/3229* (2013.01); *G06Q 20/388* (2013.01); *G06Q 20/3827* (2013.01); *G06Q 20/3829* (2013.01); *G06Q 20/407* (2013.01)

(58) Field of Classification Search
CPC ............. G06Q 20/401; G06Q 20/3229; G06Q 20/3827; G06Q 20/3829; G06Q 20/388; G06Q 20/407
See application file for complete search history.

(56) References Cited

U.S. PATENT DOCUMENTS

| | | | |
|---|---|---|---|
| 7,437,558 B2 | 10/2008 | Fenton et al. | |
| 7,493,661 B2 | 2/2009 | Liu et al. | |
| 7,644,274 B1 | 1/2010 | Jakobsson et al. | |
| 7,660,861 B2 | 2/2010 | Taylor | |
| 8,032,751 B2 | 10/2011 | Avritch et al. | |
| 8,145,718 B1 | 3/2012 | Kacker et al. | |

(Continued)

FOREIGN PATENT DOCUMENTS

| | | |
|---|---|---|
| GB | 2365160 | 2/2002 |
| JP | 2005101883 | 4/2005 |
| WO | WO 2012/007322 | 1/2012 |

OTHER PUBLICATIONS

Joswin et al., "Effective Watermarking Techniques on Structured Datasets," International Journal of Science and Research, Oct. 2015, vol. 4, Issue 10, pp. 2153-2156.

(Continued)

*Primary Examiner* — Neha Patel
*Assistant Examiner* — Courtney P Jones
(74) *Attorney, Agent, or Firm* — Hartman & Citrin LLC

(57) ABSTRACT

Concepts and technologies are disclosed herein for providing a transaction validation service. A device can receive a request to validate a transaction requested by a user device, where the transaction can be performed by an application and where the request to validate the transaction can be obtained with a first hash that is created by the user device. The first hash can include a hash of transaction data that is hashed using data stored on the user device. The device can receive an indication that the transaction has been approved, obtain a second hash of the transaction data that is hashed using the data stored on the user device, and determine, based on the first hash and the second hash, whether the transaction should be allowed or blocked.

20 Claims, 10 Drawing Sheets

(56) References Cited

U.S. PATENT DOCUMENTS

| | | | |
|---|---|---|---|
| 8,255,983 B2 | 8/2012 | Schultz et al. | |
| 8,341,023 B2 | 12/2012 | Benisti et al. | |
| 8,385,887 B2 | 2/2013 | Brown et al. | |
| 8,423,758 B2 | 4/2013 | Singhal | |
| 8,429,233 B2 | 4/2013 | Sell | |
| 8,538,028 B2 | 9/2013 | Yeap et al. | |
| 8,688,790 B2 | 4/2014 | LeVasseur et al. | |
| 8,782,415 B2 | 7/2014 | Tomkow | |
| 9,075,978 B2 | 7/2015 | Schneider et al. | |
| 9,165,291 B1* | 10/2015 | Andersen | G06Q 20/10 |
| 9,398,009 B2 | 7/2016 | Mun | |
| 10,122,734 B2 | 11/2018 | Albisu et al. | |
| 2006/0031315 A1 | 2/2006 | Fenton | |
| 2006/0123476 A1 | 6/2006 | Yaghmour | |
| 2008/0244009 A1 | 10/2008 | Rand et al. | |
| 2008/0270545 A1 | 10/2008 | Howe | |
| 2009/0259840 A1 | 10/2009 | Campbell | |
| 2012/0066498 A1 | 3/2012 | Engert | |
| 2013/0160092 A1 | 6/2013 | Benisti et al. | |
| 2013/0185209 A1* | 7/2013 | Ahn | G06Q 20/385 705/44 |
| 2013/0226789 A1* | 8/2013 | Moreira | G06Q 20/10 705/39 |
| 2015/0089217 A1 | 3/2015 | Romanik et al. | |
| 2015/0310431 A1* | 10/2015 | Lakshmanan | G06Q 20/02 705/71 |
| 2015/0341333 A1* | 11/2015 | Feng | H04L 9/3297 713/168 |
| 2016/0234025 A1 | 8/2016 | Tomkow | |
| 2017/0208464 A1* | 7/2017 | Guertler | G06Q 20/40145 |
| 2017/0364911 A1* | 12/2017 | Landrok | H04L 9/3228 |
| 2018/0108007 A1* | 4/2018 | Sawant | G06Q 20/3829 |
| 2020/0005294 A1* | 1/2020 | Rangaraj | G06Q 20/40 |
| 2020/0068399 A1* | 2/2020 | Brown | H04W 12/72 |
| 2020/0273031 A1* | 8/2020 | Narayan | H04L 9/3239 |
| 2021/0051018 A1* | 2/2021 | Fox | H04L 9/14 |

OTHER PUBLICATIONS

Kumari et al., "Security and Implementations of Three Level Security System," International Journal of Applied Engineering Research, 2015, vol. 10, No. 64, pp. 263-268.

Abadi et al., "Computer-Assisted Verification of a Protocol for Certified Email," $10^{th}$ International Static Analysis Symposium, Jun. 11-13, 2003.

Garriss et al., "RE: Reliable Email," Proceedings of the $3^{rd}$ Symposium on Networked Systems Design and Implementation, May 8-10, 2006.

Patsakis et al., "Distributing privacy policies over multimedia content across multiple online social networks," Computer Networks, Dec. 24, 2014, vol. 75, Part B, pp. 531-543.

U.S. Notice of Allowance dated Jun. 22, 2018 in U.S. Appl. No. 15/363,422.

ESPACENET Patent Search Worldwide Database, translation of the abstract for Foreign Patent Document JP 2005101883, accessed Sep. 6, 2016, available at https://worldwide.espacenet.com/patent/search/family/034460885/publication/JP2005101883A?q=JP2005101883.

* cited by examiner

TRANSACTION VALIDATION SERVICE

BACKGROUND

The use of mobile devices such as smartphones has increased over the past decades. A large percentage of secure online transactions such as email, banking, orders, and the like, may use a mobile device for part of the transaction (e.g., to shop, to order and/or pay for goods, etc.). In addition to the convenience of mobile devices such as smartphones, and their nearly almost-always-ready connectivity, mobile devices provide an evolving model of security for such transactions that may or may not be available on other platforms.

Furthermore, mobile devices often attach to a cellular or other wide-area network. In some such cases, mobile devices may use sophisticated authentication technologies and techniques to authenticate the devices and/or the users in possession of the devices. The technologies and techniques can be used to limit use of networks and/or resources to authorized personnel.

SUMMARY

The present disclosure is directed to providing a transaction validation service. A device such as a mobile device, smartphone, tablet computer, or the like, can initiate a transaction with an application hosted by an application server. The user device and the application server can be registered with the transaction validation service to enable transaction validation as illustrated and described herein, though this is not necessarily the case. The transaction can be initiated by way of the user device requesting a transaction such as, for example, sending an email using an email application, transferring funds using a banking application, accessing a remote computing device, or the like. When requesting the transaction, the user device can be configured by way of executing a transaction validation application to create and provide a first hash to the application. The first hash can correspond to a hash of some information that relates to the transaction and can be created by the user device using a private key or hash algorithm that is unique to the user device and unknown to the application server and/or the server computer. In various embodiments, the user device uses a private key and/or hash algorithm that is stored on a subscriber identity module ("SIM") card or software equivalent to create the hashes illustrated and described herein.

The application on the application server can be configured to determine that the transaction is to be validated and/or verified before completing the transaction. The application can be configured to communicate with the transaction validation service to validate the transaction. The functionality of the transaction validation service can be requested or invoked by the application by sending a request for validation of a transaction, by providing the first hash to the transaction validation service, by calling the transaction validation service via an application programming interface ("API"), otherwise invoking the transaction validation service, or the like.

The transaction validation service and/or a server computer that hosts the transaction validation service can be configured to initiate communications with the user device to validate the transaction. In some embodiments, the server computer can send transaction information to the user device to obtain information from the user device for approving or denying the transaction. In some embodiments, the server computer can send a validation request to the user device and the user device can determine if the transaction is to be allowed or not based on automatically responding to the validation request and/or based on interactions with a user or other entity. The user device can determine if the transaction is to be allowed or not and can be configured to create a second hash.

The second hash can correspond to a hash of the same information used for the first hash and can be created by the user device, again using the private key or the hash algorithm that is unique to the user device and unknown to the application server and/or the server computer. In some embodiments, the user device can require additional authentication before creating the second hash such as, for example, a biometric authentication (e.g., fingerprint, facial recognition, retinal scan, voiceprint, etc.). Thus, some embodiments of the concepts and technologies disclosed herein can ensure that the recognized user is authorizing the transaction, though this is not necessarily the case. The second hash can be sent to the server computer and the server computer can determine if the first hash matches the second hash. If the hashes match, the server computer can determine that the transaction is validated and allow the transaction to complete. Thus, some embodiments of the concepts and technologies disclosed herein can require at least three layers of authentication before allowing a transaction, where three different devices perform the three different layers of authentication, though this is not necessarily the case.

According to one aspect of the concepts and technologies disclosed herein, a system is disclosed. The system can include a processor and a memory. The memory can store computer-executable instructions that, when executed by the processor, cause the processor to perform operations. The operations can include receiving a request to validate a transaction requested by a user device, where the transaction can be performed by an application on an application server, where the request to validate the transaction can be obtained with a first hash that can be created by the user device, and where the first hash can include a hash of transaction data that can be hashed using data stored on the user device. The operations also can include receiving, from the user device, an indication that the transaction has been approved; obtaining, from the user device, a second hash that can be created by the user device, where the second hash can include a further hash of the transaction data that can be hashed using the data stored on the user device; and determining, based on the first hash and the second hash, whether the transaction should be allowed or blocked. In some embodiments, the transaction can be allowed if the first hash matches the second hash, and in some embodiments the transaction can be blocked if the first hash does not match the second hash.

In some embodiments, the data stored on the user device can include a private key that can be stored in a subscriber identity module of the user device. In some embodiments, the data stored on the user device can include a hash algorithm that can be stored in a subscriber identity module of the user device. In some embodiments, obtaining the second hash can include requesting the second hash from the user device in response to receiving the indication, wherein the user device requires a successful biometric authentication at the user device before creating the second hash. In some embodiments, receiving the indication can include sending, to the user device, a validation request including a request that the user device validate the transaction; and receiving, from the user device, a validation response including an indication that the transaction has been approved. In some embodiments, the user device can create the validation response based on user input at the user device. In some embodiments, the user device can create the validation response using a transaction validation application executed by the user device, without user input.

According to another aspect of the concepts and technologies disclosed herein, a method can be disclosed. The method can include receiving, at a device including a processor, a request to validate a transaction requested by a user device. The transaction can be performed by an application on an application server, and the request to validate the transaction can be obtained with a first hash that can be created by the user device. The first hash can include a hash of transaction data that can be hashed using data stored on the user device. The method further can include receiving, by the processor and from the user device, an indication that the transaction has been approved; obtaining, by the processor and from the user device, a second hash that can be created by the user device, where the second hash can include a further hash of the transaction data that can be hashed using the data stored on the user device; and determining, by the processor and based on the first hash and the second hash, whether the transaction should be allowed or blocked. In some embodiments, the transaction can be allowed if the first hash matches the second hash, and in some embodiments the transaction can be blocked if the first hash does not match the second hash.

In some embodiments, the data stored on the user device can include a private key that can be stored in a subscriber identity module of the user device. In some embodiments, the data stored on the user device can include a hash algorithm that can be stored in a subscriber identity module of the user device. In some embodiments, obtaining the second hash can include requesting the second hash from the user device in response to receiving the indication, wherein the user device can require a successful biometric authentication at the user device before creating the second hash. In some embodiments, the application can include a messaging service, wherein the application server can include a messaging server, and wherein the transaction can include sending an email message. In some embodiments, receiving the indication can include sending, to the user device, a validation request including a request that the user device validate the transaction; and receiving, from the user device, a validation response including the indication that the transaction has been approved. In some embodiments, obtaining the second hash can include requesting the second hash from the user device; and receiving the second hash from the user device.

According to yet another aspect, a computer storage medium is disclosed. The computer storage medium can store computer-executable instructions that, when executed by a processor, cause the processor to perform operations. The operations can include receiving a request to validate a transaction requested by a user device, where the transaction can be performed by an application on an application server, where the request to validate the transaction can be obtained with a first hash that can be created by the user device, and where the first hash can include a hash of transaction data that can be hashed using data stored on the user device. The operations also can include receiving, from the user device, an indication that the transaction has been approved; obtaining, from the user device, a second hash that can be created by the user device, where the second hash can include a further hash of the transaction data that can be hashed using the data stored on the user device; and determining, based on the first hash and the second hash, whether the transaction should be allowed or blocked. In some embodiments, the transaction can be allowed if the first hash matches the second hash, and some embodiments the transaction can be blocked if the first hash does not match the second hash.

In some embodiments, the data stored on the user device can include a private key that can be stored in a subscriber identity module of the user device. In some embodiments, the data stored on the user device can include a hash algorithm that can be stored in a subscriber identity module of the user device. In some embodiments, receiving the indication can include sending, to the user device, a validation request including a request that the user device validate the transaction; and receiving, from the user device, a validation response including the indication that the transaction has been approved. In some embodiments, the user device can create the validation response based on user input at the user device. In some embodiments, the user device can create the validation response using a transaction validation application executed by the user device, without user input.

Other systems, methods, and/or computer program products according to embodiments will be or become apparent to one with skill in the art upon review of the following drawings and detailed description. It is intended that all such additional systems, methods, and/or computer program products be included within this description and be within the scope of this disclosure.

DETAILED DESCRIPTION

Figure 1:
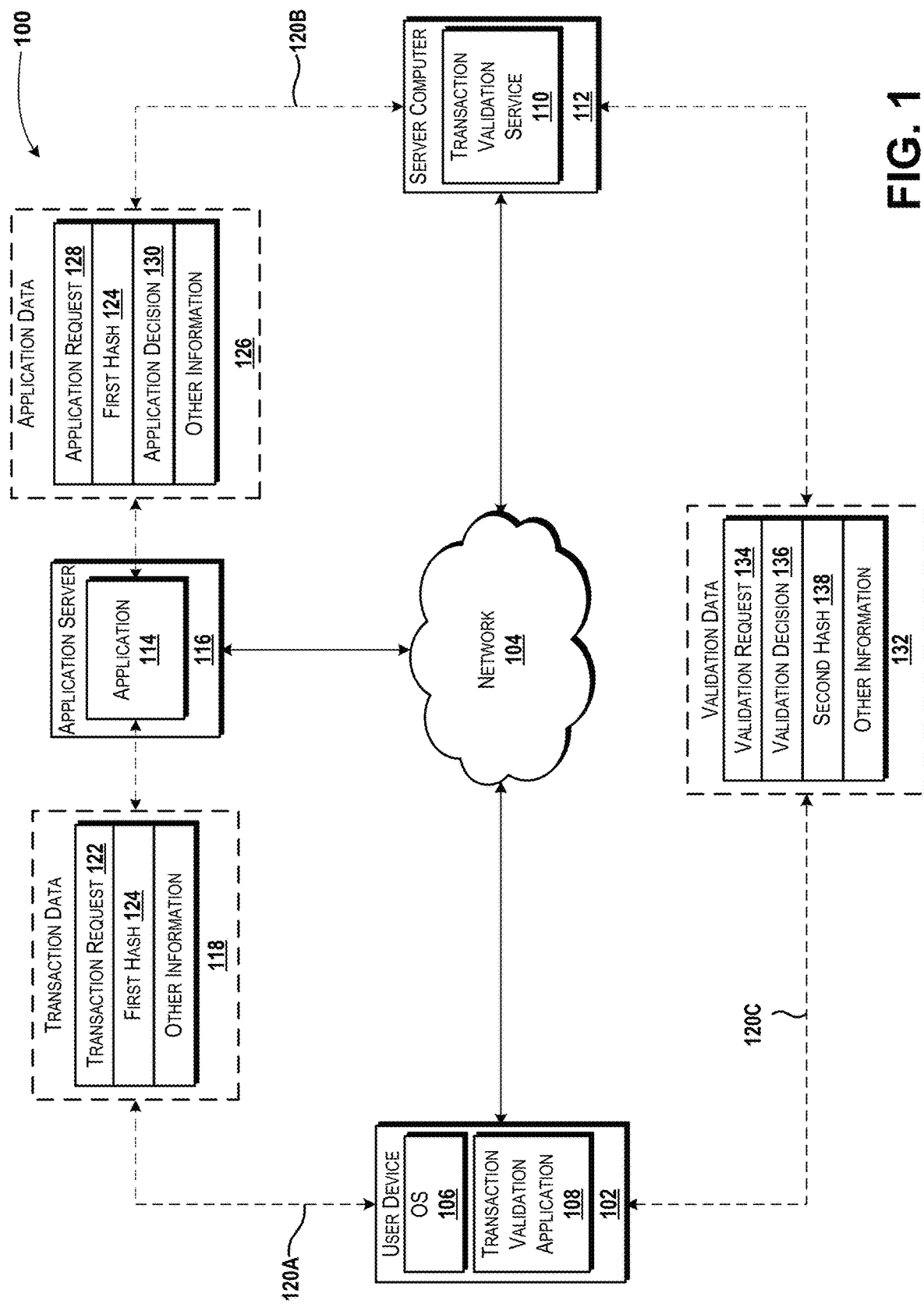
FIG. 1 is a system diagram illustrating an illustrative operating environment for various embodiments of the concepts and technologies described herein.

The following detailed description is directed to providing a transaction validation service. A device such as a mobile device, smartphone, tablet computer, or the like, can initiate a transaction with an application hosted by an application server. The transaction can be initiated by way of the user device requesting a transaction such as, for example, sending an email using an email application, transferring funds using a banking application, accessing a remote computing device, or the like. When requesting the transaction, the user device can be configured by way of executing a transaction validation application to create and provide a first hash to the application. The first hash can correspond to a hash of some information that relates to the transaction and can be created by the user device using a private key or hash algorithm that is unique to the user device and unknown to the application server and/or the server computer. In various embodiments, the user device uses a private key and/or hash algorithm that is stored on a SIM card (or software equivalent) to create the hashes illustrated and described herein.

The application on the application server can be configured to determine that the transaction is to be validated and/or verified before completing the transaction. The application can be configured to communicate with the transaction validation service to validate the transaction. The functionality of the transaction validation service can be requested or invoked by the application by sending a request for validation of a transaction, by providing the first hash to the transaction validation service, by calling the transaction validation service via an API, combinations thereof, or the like.

The transaction validation service and/or a server computer that hosts the transaction validation service can be configured to initiate communications with the user device to validate the transaction. In some embodiments, the server computer can send transaction information to the user device to obtain information from the user device for approving or denying the transaction. In some embodiments, the server computer can send a validation request to the user device and the user device can determine if the transaction is to be allowed or not based on automatically responding to the validation request and/or based on interactions with a user or other entity. The user device can determine if the transaction is to be allowed or not and can be configured to create a second hash. The second hash can correspond to a hash of the same information used for the first hash and can be created by the user device, again using the private key or the hash algorithm that is unique to the user device and unknown to the application server and/or the server computer. In some embodiments, the user device can require additional authentication before creating the second hash such as, for example, a biometric authentication (e.g., fingerprint, facial recognition, retinal scan, voiceprint, etc.). Thus, some embodiments of the concepts and technologies disclosed herein can ensure that the recognized user is authorizing the transaction, though this is not necessarily the case. The second hash can be sent to the server computer and the server computer can determine if the first hash matches the second hash. If the hashes match, the server computer can determine that the transaction is validated and allow the transaction to complete. Thus, some embodiments of the concepts and technologies disclosed herein can require at least three layers of authentication before allowing a transaction, where three different devices perform the three different layers of authentication, though this is not necessarily the case.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

Referring now to FIG. 1, aspects of an operating environment 100 for various embodiments of the concepts and technologies disclosed herein for transaction validation service will be described, according to an illustrative embodiment. The operating environment 100 shown in FIG. 1 includes a user device 102. The user device 102 can operate in communication with and/or as part of a communications network ("network") 104, though this is not necessarily the case.

According to various embodiments, the functionality of the user device 102 may be provided by one or more mobile telephones, tablet computers, smartphones, smartwatches, and the like. It should be understood that the functionality of the user device 102 can be provided by a single device, by two similar devices, and/or by two or more dissimilar devices. For purposes of describing the concepts and technologies disclosed herein, the user device 102 is described herein as a smartphone. It should be understood that this embodiment is illustrative, and should not be construed as being limiting in any way.

The user device 102 can execute an operating system 106 and one or more application programs such as, for example, a transaction validation application 108. The operating system 106 can include a computer program for controlling the operation of the user device 102. The transaction validation application 108 can include an executable program that can be configured to execute on top of the operating system 106 to provide various functions as illustrated and described herein for validating and/or verifying a transaction.

The transaction validation application 108 can be configured to provide various functionality at the user device 102 to validate and/or verify a transaction, as will be explained in detail herein. According to various embodiments, the transaction validation application 108 can interact with a transaction validation service 110 to provide the functionality illustrated and described herein for verifying and/or validating a transaction. As shown in FIG. 1, the transaction validation service 110 can include a service and/or application that is executed by and/or hosted by a computing device such as a server computer 112. Because the functionality of the server computer 112 can be provided by other computing devices, it should be understood that this embodiment is illustrative and should not be construed as being limiting in any way. Details of how the transaction validation application 108 and the transaction validation service 110 can enable transaction verification and/or validation will be explained in more detail below after introducing the various entities shown in FIG. 1.

As shown in FIG. 1, the operating environment 100 also can include an application 114. The application 114 can include a hosted or executed application, which can be hosted or executed by an application server 116. According to various embodiments, the functionality of the application server 116 can be provided by one or more application servers, web servers, or other computing devices. For purposes of illustrating and describing the concepts and technologies disclosed herein, the application server 116 will be described as a web server that hosts an application (e.g., a website or other web-based application). Some examples of the application 114 include, but are not limited to, an email service or application, a banking application, remote desktop application, or other application. Because other embodiments of the application 114 and the application server 116 are contemplated and are possible, it should be understood that these examples are illustrative, and therefore should not be construed as being limiting in any way.

In various embodiments, the user device 102 can request a transaction via communications with the application 114 on the application server 116. In one contemplated example, the user device 102 can interact with the application 114 to request the sending of an email message. As shown in FIG. 1, the user device 102 can make this application request via exchanging transaction data 118 with the application server 116. The transaction data 118 can include any data exchanged between the user device 102 and the application server 116 as part of the transaction including, but not limited to, communications for requesting the transaction (e.g., connection setup communications, authentication, and the like), communications during the transaction (e.g., user input, application feedback, etc.), and post-transaction communications (e.g., providing transactions receipts, closing connections, etc.). As such, the illustrated transaction data 118 should be understood as being illustrative of some types of information that can be exchanged by the user device 102 and the application server 116 and should not be construed as being limiting in any way.

As shown in FIG. 1, the transaction data 118 can be exchanged by the user device 102 and the application server 116 via a first communication channel 120A. The first communication channel 120A can be provided by the network 104 and/or other networking communications and/or devices (not shown separately in FIG. 1). As shown in FIG. 1, the transaction data 118 can include a transaction request 122, a first hash 124, and other information. The transaction request 122 can correspond to a request for a particular transaction (e.g., a request to send an email, a request to transfer funds, or other kinds of requests). According to various embodiments, the transaction request 122 can include an explicit request for a particular transaction, while in some other embodiments the transaction request 122 can include an implicit request for the particular transaction (e.g., communications by the user device 102 with the application server 116 can be understood by the application 114 as corresponding to a request for a transaction).

According to various embodiments of the concepts and technologies disclosed herein, the transaction request 122 illustrated and described herein can be created by the user device 102 and can be sent by the user device 102 to the application 114 with a first hash 124. The creation of the transaction request 122 and the first hash 124 can be controlled by the transaction validation application 108, in various embodiments. In particular, the transaction validation application 108 can be configured to communicate with the application server 116 when a particular transaction is requested. For example, the application 114 can be registered as an application 114 for which transactions will be verified and/or validated using the transaction validation application 108. Such registration can occur at any time and can be used to indicate what applications 114 and/or types of applications will be verified and/or validated by the transaction validation application 108 and/or other parameters for invoking the validation and/or verification of transactions as illustrated and described herein.

The transaction validation application 108 also can be configured to create the first hash 124 when a transaction is requested, and to provide the first hash 124 to the application 114. In some embodiments, the transaction validation application 108 can be configured to generate the first hash 124 on request by the application 114, while in some other embodiments the transaction validation application 108 can be configured to create the first hash 124 without being requested to do so. In the illustrated embodiment, the transaction validation application 108 can create the first hash 124 automatically during request or setup of the transaction and provides the first hash 124 to the application 114 when the transaction is requested (e.g., when sending the transaction request 122 to the application 114). It should be understood that this example is illustrative, and therefore should not be construed as being limiting in any way. The transaction data 118 also can include other information such as, for example, setup communications, location information, confirmations, acknowledgements, requests for hashes, etc. Because other types of information can be exchanged by the user device 102 and the application 114, it should be understood that these examples are merely illustrative.

The application 114 can be configured to communicate with the transaction validation service 110 to verify and/or validate the transaction being requested by the user device 102. It can be appreciated that this verification and/or validation can be requested not only to verify that the transaction has in fact been requested by the user device 102, but also to verify the particulars of the transaction, thereby potentially providing protection against some types of malicious electronic activity such as, for example, man-in-the-middle attacks, other forms of spoofing and/or eavesdropping, combinations thereof, or the like. In particular, the application 114 can be configured to communicate with the transaction validation service 110 to request validation and/or verification of the transaction, obtain a decision from the transaction validation service 110 relating to validation and/or verification of the transaction, and to implement the decision regarding validation as will be explained in more detail herein.

In various embodiments of the concepts and technologies disclosed herein, the application 114 can be configured to communicate with the transaction validation service 110 via a second communication channel 120B. The second communication channel 120B can be provided by the network 104 and/or other networking communications and/or devices (not shown separately in FIG. 1). As shown in FIG. 1, the application data 126 can include various types of data and/or information that can be used to validate and/or verify the transaction. As shown in FIG. 1, the application data 126 can include, but is not limited to, a request to validate and/or verify a transaction (hereinafter referred to as an application request 128), an application decision 130, the first hash 124, and other information.

The application request 128 can correspond to a request to validate and/or verify a particular transaction (e.g., the transaction that has begun and/or that is occurring between the user device and the application 114). In various embodiments, the application 114 can create the application request 128. In some other embodiments, the application request 128 can correspond to a service call (requesting or invoking the transaction validation service 110), where this service call can be made via an API. This API can be exposed, in some embodiments, by the server computer 112 (though this API is not separately illustrated in FIG. 1). In some other embodiments the application request 128 can be sent to the server computer 112 (and need not be a service call and/or need not be an API call). Regardless of how the application request 128 is made, the server computer 112 can be configured to recognize the application request 128 as a request to validate and/or verify the transaction.

The application data 126 also can include the first hash 124, which as noted above can be obtained by the application 114 by way of the transaction data 118. In some embodiments, the application 114 can send the first hash 124 with the application request 128. In some other embodiments, the first hash 124 can serve the function of the application request 128, whereby receipt of the first hash 124 by the server computer 112 can cause the server computer 112 to determine that verification and/or validation of a transaction is being requested by the application 114. It should be understood that this example is illustrative, and therefore should not be construed as being limiting in any way.

The application data 126 also can include an application decision 130. As will be explained in more detail below, the transaction validation service 110 can be configured to validate and/or verify the transaction via communications with the user device 102. The transaction validation service 110 also can be configured to provide an application decision 130 to the application 114. The application decision 130 can indicate whether the transaction should or should not be allowed and/or if the transaction should or should not be blocked. The use of the application decision 130 by the application 114 will be explained in more detail below. Based on the application decision 130, one or more entities (e.g., the application 114) can be configured to allow or block the transaction, to trigger blocking or allowing of the transaction, and/or to take various other actions (e.g., to send alerts or notifications, etc.). The creation of the application decision 130 and/or the providing of the application decision 130 to the application 114 will be explained in more detail below, particularly with reference to FIG. 3.

The transaction validation service 110 can be configured to communicate with the user device 102. In particular, the transaction validation service 110 can be configured to communicate with the transaction validation application 108 to provide the functionality described herein for verifying and/or validating transactions. In various embodiments of the concepts and technologies disclosed herein, the transaction validation service 110 can be configured to communicate with the transaction validation application 108 (e.g., via their respective devices, the server computer 112 and the user device 102) via third communication channel 120C. The third communication channel 120C can be provided by the network 104 and/or other networking communications and/or devices (not shown separately in FIG. 1).

As shown in FIG. 1, the transaction validation service 110 and the transaction validation application 108 can exchange validation data 132. The validation data 132 can include various types of data and/or information that can be used to validate and/or verify the transaction. As shown in FIG. 1, the validation data 132 can include, but is not limited to, a request for the device to validate and/or verify a transaction (hereinafter referred to as a "validation request 134"), a decision issued by the device relating to the validation request 134 (hereinafter referred to as a "validation decision 136"), a second hash 138, and other information.

The validation request 134 can correspond to a request for the user device 102 (e.g., by way of interactions with the transaction validation application 108) to validate and/or verify a particular transaction (e.g., the transaction that has begun and/or that is occurring between the user device and the application 114). In various embodiments, the transaction validation service 110 can create the validation request 134 and can send the validation request 134 to the user device 102. Regardless of how the validation request 134 is made, the user device 102 can be configured to recognize the validation request 134 as a request to validate and/or verify the transaction.

In response to the validation request 134, the user device 102 (e.g., by way of executing the transaction validation application 108) can be configured to determine how to respond to the validation request 134, e.g., whether to respond that the transaction is authentic and/or authorized and therefore should be allowed or should not be blocked, or whether the transaction is inauthentic and/or unauthorized and therefore should not be allowed and/or should be blocked. In some embodiments, the user device 102 can be configured to display a notice or alert at the user device 102 and to obtain feedback from an authorized entity (e.g., a user of the user device 102), while in some other embodiments the user device 102 can be configured (e.g., via execution of the transaction validation application 108) to automatically respond to the validation request 134. For example, the transaction validation application 108 can be configured in some embodiments to broker the transaction, thereby acting as a go-between of sorts between the user device 102 and the application 114 (though the go-between is in this case located on the user device 102). At any rate, input associated with the transaction can be monitored and/or brokered by the transaction validation application 108 and used to respond to the validation request 134, in some embodiments. Regardless of how made, the validation decision 136 can indicate whether the transaction is to be allowed or not; blocked or not.

If the validation decision 136 indicates that the transaction is not to be allowed and/or is to be blocked, the server computer 112 can be configured (e.g., by execution of the transaction validation service 110) to take actions based on that validation decision 136. For example, the server computer 112 can be configured to instruct the application 114 to stop the transaction, to instruct the user device 102 to stop the transaction, or the like. In some embodiments, the user device 102 can be configured (e.g., by way of the transaction validation application 108) to stop the transaction automatically when a validation decision 136 indicates that the transaction is not to be allowed and/or that the transaction is to be blocked. Thus, for example, the transaction validation application 108 can cause the user device 102 to disconnect from the first communication channel 120A if the validation decision 136 indicates that the transaction is not to be allowed and/or that the transaction is to be blocked. It should be understood that this example is illustrative, and therefore should not be construed as being limiting in any way.

In some embodiments, the user device 102 can be configured to send the validation decision 136 only if the transaction is to be blocked and/or if the transaction is not to be allowed. In some other embodiments, the user device 102 can be configured to send the validation decision 136 in any case (whether the transaction is being allowed or not). In some embodiments, the user device 102 can create a second hash 138 if the user device 102 determines that the transaction is authorized and/or is to be allowed and/or is not to be blocked. The second hash 138 can include a hash of the same data represented by the first hash 124 and can be created by the user device 102 using the same key that was used to generate the first hash 124. Thus, according to various embodiments of the concepts and technologies disclosed herein, the first hash 124 and the second hash 138 can be identical if the transaction is authorized. The server computer 112 can be configured to receive the second hash 138, compare the second hash 138 to the first hash 124 and, if the hashes match and if the validation decision 136 indicates that the transaction is authorized, to instruct the application 114 to allow the transaction to proceed. These and other aspects of the concepts and technologies disclosed herein will become clearer with continued reference to the FIG. 1 and the remaining drawings, as well as the associated description below.

In practice, the user device 102 can initiate a transaction with the application 114 hosted by the application server 116. The transaction can be initiated by way of requesting a transaction. When requesting the transaction, the user device 102 can be configured by way of executing the transaction validation application 108 to create and provide the first hash 124 to the application 114. The first hash 124 can correspond to a hash of some information that relates to the transaction using a private key or hash algorithm that is unique to the user device 102 and unknown to the application server 116 and/or the server computer 112.

The application 114 can be configured to determine that the transaction is to be validated and/or verified before completing the transaction. The application 114 can be configured to communicate with the transaction validation service 110 to validate the transaction. The functionality of the transaction validation service 110 can be requested or invoked by the application 114 by sending a request for validation of a transaction (e.g., the application request 128), by providing the first hash 124 to the transaction validation service 110, by calling the transaction validation service 110 via an API, combinations thereof, or the like.

The transaction validation service 110 and/or a server computer 112 that hosts the transaction validation service 110 can be configured to initiate communications with the user device 102 to validate the transaction. In some embodiments, the server computer 112 can send transaction information to the user device 102 to obtain information from the user device 102 for approving or denying the transaction. In some embodiments, the server computer 112 can send a validation request 134 to the user device 102 and the user device 102 can determine if the transaction is to be allowed or not based on automatically responding to the validation request 134 and/or based on interactions with a user or other entity.

The user device 102 can determine if the transaction is to be allowed or not and can be configured to create a second hash 138. The second hash 138 can correspond to a hash of the same information used for the first hash 124 and can be created again using the private key or the hash algorithm that is unique to the user device 102 and unknown to the application server 116 and/or the server computer 112. In some embodiments, the user device 102 can require additional authentication before creating the second hash 138 such as, for example, a biometric authentication (e.g., fingerprint, facial recognition, retinal scan, voiceprint, etc.) to ensure that the recognized user is authorizing the transaction. The second hash 138 can be sent to the server computer 112 and the server computer 112 can determine if the first hash 124 matches the second hash 138. If the hashes match, the server computer 112 can determine that the transaction is validated and allow the transaction to complete. Thus, some embodiments of the concepts and technologies disclosed herein can require at least three layers of authentication before allowing a transaction, where three different devices perform the three different layers of authentication, though this is not necessarily the case. Additional details of these and other aspects of the concepts and technologies disclosed herein will be illustrated and described below with reference to FIGS. 2-9.

FIG. 1 illustrates one user device 102, one network 104, one server computer 112, and one application server 116. It should be understood, however, that various implementations of the operating environment 100 can include one or more than one user device 102, one or more than one network 104, one or more than one server computer 112, and one or more than one application server 116. As such, the illustrated embodiment should be understood as being illustrative, and should not be construed as being limiting in any way.

Figure 2:
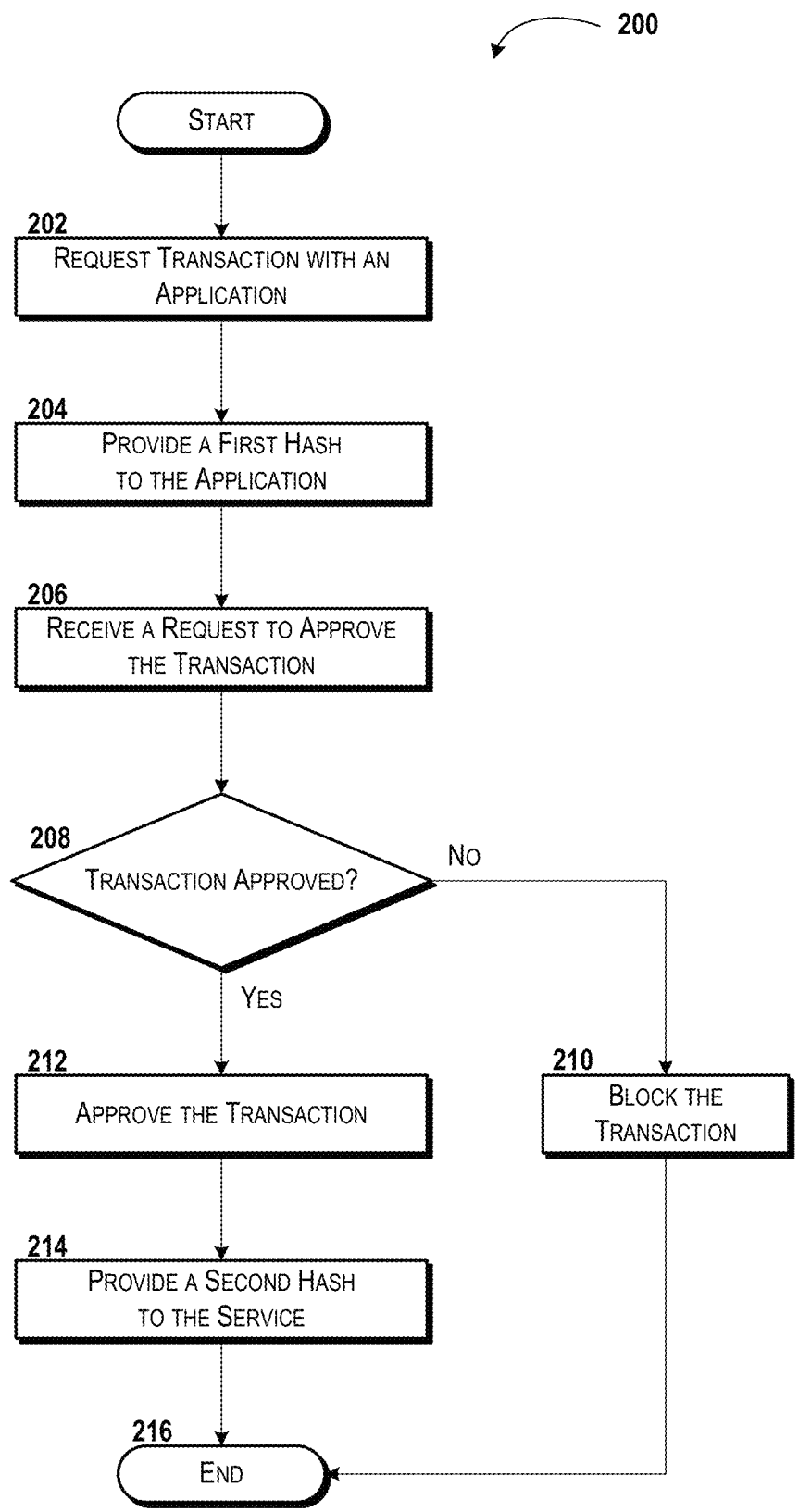
FIG. 2 is a flow diagram showing aspects of a method for validating a transaction using a transaction validation application, according to an illustrative embodiment of the concepts and technologies described herein.

Turning now to FIG. 2, aspects of a method 200 for validating a transaction using a transaction validation application 108 will be described in detail, according to an illustrative embodiment. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the methods disclosed herein can be ended at any time and need not be performed in its entirety. Some or all operations of the methods, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing a processor of a computing system or device, such as the user device 102 and/or the server computer 112 to perform one or more operations and/or causing the processor to direct other components of the computing system or device to perform one or more of the operations.

For purposes of illustrating and describing the concepts of the present disclosure, the method 200 is described herein as being performed by the user device 102 via execution of one or more software modules such as, for example, the transaction validation application 108. It should be understood that additional and/or alternative devices and/or network nodes can provide the functionality described herein via execution of one or more modules, applications, and/or other software including, but not limited to, the transaction validation application 108. Thus, the illustrated embodiments are illustrative, and should not be viewed as being limiting in any way.

The method 200 begins at operation 202. At operation 202, the user device 102 can request a transaction with an application 114 (e.g., an application hosted by an application server, a web server, or the like). According to various embodiments of the concepts and technologies disclosed herein, the transaction can include various types of transactions such as, for example, requesting the sending of an email via an email application or email service; requesting a transfer or payment via a banking application or banking service; requesting a remote session via a desktop or computer sharing application or service; or requesting any other type of transaction for which a user may be authenticated in one way or another (e.g., via password/login information, etc.). According to various embodiments of the concepts and technologies disclosed herein, the application or service (e.g., the application 114 shown in FIG. 1) can be registered with the transaction validation service 110 to allow or to require users or other entities to validate and/or verify a transaction using the transaction validation service 110.

Thus, it can be appreciated that the concepts and technologies disclosed herein are distinguishable from concepts and technologies disclosed herein for authenticating a user or other entity to access a portal or other functionality that can be used to perform a transaction in that the concepts and technologies disclosed herein can be used to validate and/or verify a transaction, which can add an additional and/or improved layer of security and/or validation on top of standard authentication with a website, application, or service. In particular, because certain malicious attacks are designed to exploit trusted communication channels between authenticated users and a service (e.g., man-in-the-middle attacks, etc.), improved authentication of a user or device may or may not avoid unauthorized transactions. Some embodiments of the concepts and technologies disclosed herein, however, can enable validation of a transaction, thereby potentially protecting against some times of attacks. Because these benefits are not necessarily present in all embodiments of the concepts and technologies disclosed herein, it should be understood that the above are illustrative of some embodiments and therefore should not be construed as being limiting in any way.

From operation 202, the method 200 can proceed to operation 204. At operation 204, the user device 102 can provide a first hash 124 to the application 114. According to various embodiments of the concepts and technologies disclosed herein, the first hash 124 can include a hash of some information that is relevant to the transaction that was requested in operation 202. According to various embodiments of the concepts and technologies disclosed herein, the transaction validation application 108 can be configured to identify information that is to be hashed for a particular transaction. Thus, some embodiments of the transaction validation application 108 can ensure that a specific type of information is hashed. In some embodiments, the use of the same information to create the hashes can ensure that the first hash 124 and the second hash 138 will match for a particular transaction, as will be more clearly understood after reading through the entire disclosure herein.

In some embodiments, the information hashed in operation 204 can correspond to some static and/or objective aspect of the transaction such as, for example, a universal time at which the transaction was initiated, a geographic location at which the transaction was initiated, routing information for a first packet sent or received in association with the transaction, an amount associated with a transaction being requested, an email address of a recipient, or other transaction-specific and/or device-specific information that can be known to the transaction validation application 108 and/or that can be static (e.g., unchanging) for the duration of the transaction. This can be important for the computation of the second hash 138, as will be more clearly understood after reading through the entire disclosure.

According to various embodiments of the concepts and technologies disclosed herein, the hashing that is performed by the transaction validation application 108 can rely on and can enable a user or other entity to leverage existing and/or underlying mobile cryptography technologies. Thus, according to various embodiments of the concepts and technologies disclosed herein, the transaction validation application 108 can be authorized to use a private authentication key stored on the device SIM (or software equivalent) to create the hash.

In one example embodiment, the user device 102 can use a private authentication key during authentication with a network (e.g., the network 104) and the transaction validation application 108 can use this private authentication key to hash the transaction information as illustrated and described herein. Thus, various embodiments of the concepts and technologies disclosed herein can provide the functionality of operation 204 by way of the user device 102 hashing the transaction information using a hash algorithm or private key that is stored in a device SIM or software equivalent. Such embodiments can leverage powerful and effective mobile cryptography for almost any transaction, as will be explained in more detail below.

From operation 204, the method 200 can proceed to operation 206. At operation 206, the user device 102 can receive a request to approve the transaction that was requested in operation 202. According to various embodiments of the concepts and technologies disclosed herein, the request received in operation 206 can include some indication of transaction specifics (e.g., the website being used for the transaction, an amount associated with the transaction, a recipient associated with the transaction, an action requested by way of the transaction, an email address associated with the transaction, a subject line associated with the transaction, combinations thereof, or the like). According to various embodiments of the concepts and technologies disclosed herein, the application 114 (with which the transaction is being completed) may not attempt to verify or validate the transaction directly with the user device 102. Rather, as will be explained more detail, particularly with reference to FIGS. 3-4, the request to validate the transaction can be initiated by the transaction validation service 110. Thus, operation 206 can correspond, in various embodiments, to the user device 102 receiving, from the transaction validation service 110, the validation request 134 illustrated and described above with reference to FIG. 1. The validation request 134 received in operation 206 can effectively instruct the user device 102 to validate and/or verify the transaction that has been requested in operation 202, for example to attempt to ensure that the transaction is authentic.

From operation 206, the method 200 can proceed to operation 208. At operation 208, the user device 102 can determine if the transaction is to be approved. In some embodiments, the user device 102 can present, at the user device 102, a screen display or other interface for soliciting input from a user or other entity to indicate if the transaction is to be validated and/or verified. In some other embodiments, the transaction validation application 108 can be configured to determine, without input from a user or other entity, if the transaction is to be verified and/or validated. Both embodiments will be explained here.

In some embodiments, as noted above, a user or other entity can be interfaced with by the user device 102 to determine if the transaction is to be validated and/or verified. In some embodiments, for example, the user device 102 can be configured (e.g., by way of executing the transaction validation application 108) to present a user interface or screen display to obtain input for allowing or blocking the transaction. In some contemplated embodiments, an alert screen or the like can be presented at the user device 102 to inform a user or other entity that a transaction has been requested, to present details regarding the transaction, and to obtain input to allow or block the transaction (among other options). Thus, operation 208 can correspond, in some embodiments, to presenting one or more user interfaces at the user device 102 and obtaining input that indicates whether or not the transaction is to be validated. It should be understood that this example is illustrative, and therefore should not be construed as being limiting in any way.

In some other embodiments, as noted above, the user device 102 can be configured (e.g., by way of executing the transaction validation application 108) to determine if the transaction is to be allowed or blocked. For example, in some embodiments of the concepts and technologies disclosed herein, the transaction validation application 108 can operate as a broker for some or all transactions. Thus when the user device 102 connects to the application server 116 to request a transaction, some data associated with that transaction can be brokered by the transaction validation application 108.

The transaction validation application 108 therefore can be aware, in some embodiments, of whether or not the transaction has been requested, as well as specific transaction information associated with that transaction. As such, operation 208 can correspond, in some embodiments, to the user device 102 determining if the transaction information provided with the request received in operation 206 matches the transaction that actually has been requested (e.g., in operation 202). In some such embodiments, the user device 102 can automatically determine that a transaction is not to be validated or verified if the transaction specifics provided in operation 206 (if included) do not match input actually created by the user device 102, if no such transaction was requested, and/or for other reasons that the transaction validation application 108 determines to render the transaction unauthorized.

If the user device 102 determines, in operation 208, that the transaction is not to be approved, the method 200 can proceed to operation 210. At operation 210, the user device 102 can block the transaction. Although not separately shown in FIG. 2, it should be understood that the user device 102 also can inform the transaction validation service 110 that the transaction is to be blocked. In some embodiments, for example the embodiment shown in FIG. 1, the user device 102 can send a validation decision 136 to the transaction validation service 110 to indicate that the transaction has been blocked by the user device 102 and/or to inform the transaction validation service 110 that action should be taken to block the transaction.

In some embodiments, for example, the user device 102 can block the transaction by disconnecting from the application server 116, by cancelling the transaction via communicating a cancellation to the application 114, and/or by triggering or requesting other devices to block the transaction. As such, it should be understood that the functionality of operation 210 can include the user device 102 taking some direct action to block the transaction and/or taking some action to prompt other devices to block the transaction. In any such embodiments, the user device 102 can be configured to inform a user or other entity (e.g., via an alert, push notification, email, text message, or the like), that the transaction has been blocked. It should be understood that this example is illustrative, and therefore should not be construed as being limiting in any way.

If the user device 102 determines, in operation 208, that the transaction is to be approved, the method 200 can proceed to operation 212. At operation 212, the user device 102 can approve the transaction and/or otherwise can indicate that the transaction is to be approved. In some embodiments, for example the embodiment shown in FIG. 1, the user device 102 can send a validation decision 136 to the transaction validation service 110 to indicate that the transaction has been approved by the user device 102 and/or to request that the transaction validation service 110 allow the transaction. In some embodiments of operation 212, the validation decision 136 can be sent to the transaction validation service 110 and the server computer 112 can be configured to respond to the validation decision 136 with a request for the second hash 138. In some other embodiments, the validation decision 136 can be sent with the second hash 138. The sending of the second hash 138 is illustrated separately in FIG. 2 for convenience and should not be construed as being limiting in any way.

From operation 212, the method 200 can proceed to operation 214. At operation 214, the user device 102 can provide the second hash 138 to the transaction validation service 110. Although not separately illustrated in FIG. 2, some embodiments of the concepts and technologies disclosed herein can require an additional layer of authentication at the user device 102 before creating and/or providing the second hash 138. Thus, embodiments of the concepts and technologies disclosed herein can use various types of security and/or authentication that can be provided by the user device 102 to ensure that only authorized entities can authorize a transaction. For example, the user device 102 can require a fingerprint authentication, a facial recognition authentication, voiceprint authentication, other biometric authentication, and/or other authentication techniques to limit the verification and/or validation to a recognized person. It should be understood that this example is illustrative, and therefore should not be construed as being limiting in any way.

According to various embodiments of the concepts and technologies disclosed herein, the second hash 138 can include a hash of some information that is relevant to the transaction that was requested in operation 202. In some embodiments, the second hash 138 can include a hash of the same information hashed in operation 204. In particular, the use of the same information to create the second hash 138 (relative to the information used to create the first hash 124) can ensure that the first hash 124 and the second hash 138 will match if the transaction is authentic.

In some embodiments, the information hashed in operation 214 therefore can correspond the same static or unchanging information used to create the first hash 124 such as, for example, a universal time at which the transaction was initiated, a geographic location at which the transaction was initiated, routing information for a first packet sent or received in association with the transaction, an amount associated with a transaction being requested, an email address of a recipient, or other transaction-specific and/or device-specific information. Because other information and/or types of information can be used to create the first hash 124 and/or the second hash 138, it should be understood that these examples provided above are illustrative of the concepts and technologies disclosed herein and therefore should not be construed as being limiting in any way. As was explained above, various embodiments of the concepts and technologies disclosed herein can provide the functionality of operation 214 by way of the user device 102 hashing the transaction information using a hash algorithm or private key that is stored in a device SIM or software equivalent. It should be understood that this example is illustrative, and therefore should not be construed as being limiting in any way.

From operation 214, the method 200 can proceed to operation 216. The method 200 also can proceed to operation 216 from operation 210. The method 200 can end at operation 216.

Figure 3:
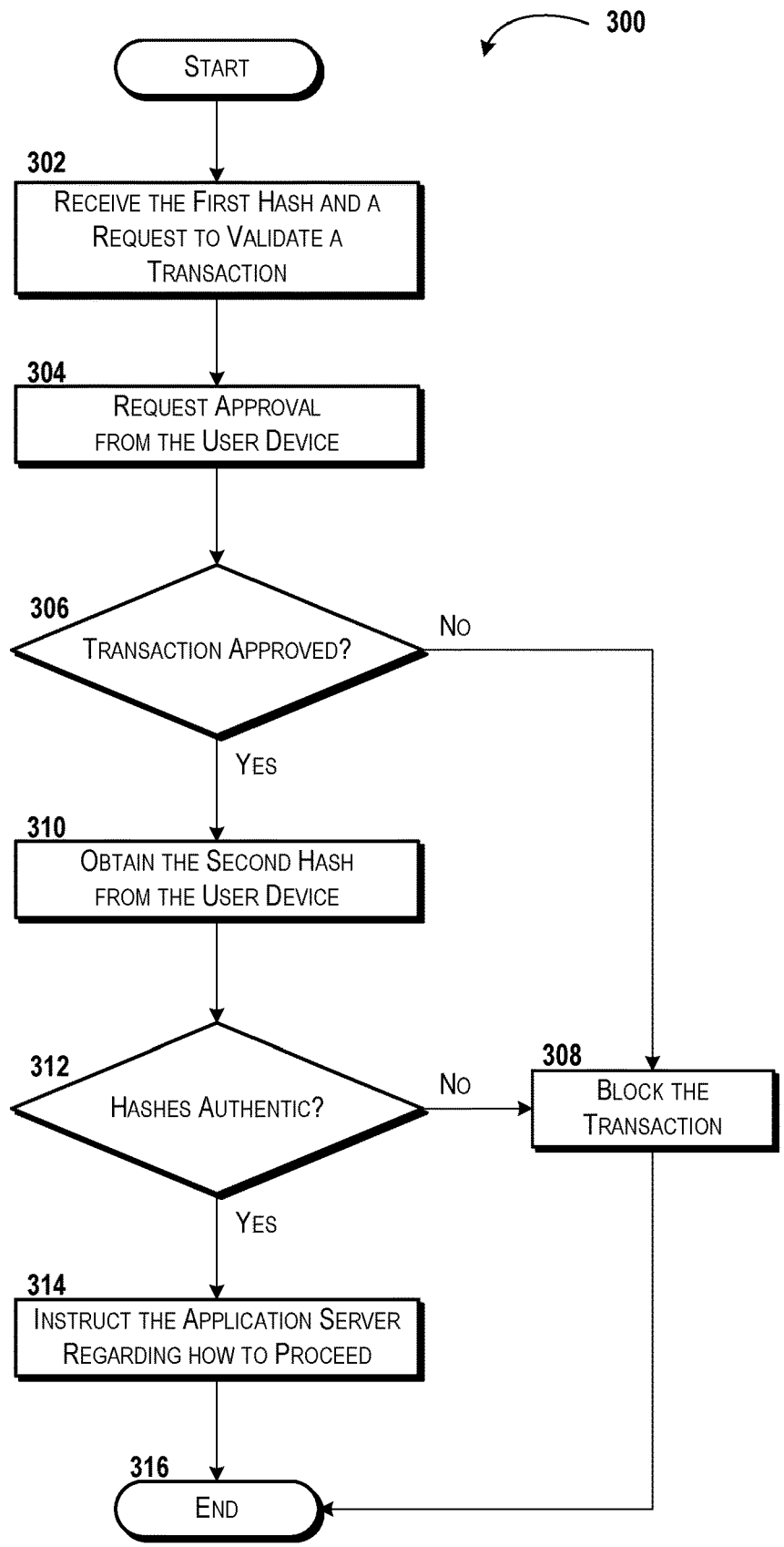
FIG. 3 is a flow diagram showing aspects of a method for validating a transaction using a transaction validation service, according to an illustrative embodiment of the concepts and technologies described herein.

Turning now to FIG. 3, aspects of a method 300 for validating a transaction using a transaction validation service 110 will be described in detail, according to an illustrative embodiment. For purposes of illustrating and describing the concepts of the present disclosure, the method 300 is described herein as being performed by the server computer 112 via execution of one or more software modules such as, for example, the transaction validation service 110. It should be understood that additional and/or alternative devices and/or network nodes can provide the functionality described herein via execution of one or more modules, applications, and/or other software including, but not limited to, the transaction validation service 110. Thus, the illustrated embodiments are illustrative, and should not be viewed as being limiting in any way.

The method 300 begins at operation 302. At operation 302, the server computer 112 can receive a request to validate a transaction (e.g., the application request 128 shown in FIG. 1). As explained above, in some embodiments of the concepts and technologies disclosed herein, the transaction validation service 110 can be configured as a callable service that can be called via an API to provide the first hash 124 and to request that the transaction be verified and/or validated. In some other embodiments, the application 114 can generate the application request 128 and can provide the first hash 124 and the application request 128 to the transaction validation service 110 (either simultaneously or non-simultaneously). In any event, the application request 128 can request that the transaction validation service 110 verify the transaction occurring between the application 114 and the user device 102 as illustrated and described herein.

From operation 302, the method 300 can proceed to operation 304. At operation 304, the server computer 112 (e.g., by way of executing and/or hosting the transaction validation service 110) can request approval of the transaction from the user device 102. As discussed above, the transaction validation service 110 can send a validation request 134 to the user device 102. It should be understood that in some embodiments of the concepts and technologies disclosed herein, the validation request 134 need not be a data file or instruction for requesting validation. Rather, it should be understood that the transaction validation service 110 can communicate with the transaction validation application 108 to request validation of the transaction with or without actually generating and/or sending the validation request 134 as an explicit file or instruction. Thus, in operation 304, the server computer 112 can request, from the user device 102, that the transaction be validated and/or verified.

From operation 304, the method 300 can proceed to operation 306. At operation 306, the server computer 112 can determine if the transaction has been authorized, allowed, verified, validated, and/or otherwise approved by the user device 102. As can be appreciated from the description of FIG. 2 above, operation 306 can correspond to the server computer 112 receiving, from the user device 102, a validation decision 136 that indicates that the transaction has been allowed or that the transaction has not been allowed; that the transaction has been blocked or has not been blocked; or the like. It can be appreciated based on the discussion above with reference to operation 304, that the indication of whether the transaction should be allowed or not can be sent as a data file or instruction (e.g., the validation decision 136) and/or can be indicated via communications between the transaction validation application 108 and the transaction validation service 110. Thus, regardless of how the indication is made, operation 306 can correspond to the user device 102 indicating, to the server computer 112, that the transaction is or is not valid; is or is not verified; is or is not to be allowed; is or is not approved; and/or is or is not to be blocked.

If the server computer 112 determines, in operation 306, that the transaction has not been approved, the method 300 can proceed to operation 308. At operation 308, the server computer 112 can block the transaction. In some embodiments, the server computer 112 can be configured to block the transaction and/or to issue instructions (e.g., to the user device 102, the application 114, and/or other devices or entities) to block or interrupt the transaction. In some embodiments, for example, the server computer 112 can block the transaction by instructing the user device 102 to disconnect from the application server 116, by instructing the transaction validation application 108 to stop the transaction, by instructing the application 114 to stop the transaction, by instructing the application server 116 to disconnect from the user device 102, by triggering or requesting other devices to block the transaction, combinations thereof, or the like. As such, it should be understood that the functionality of operation 308 can include the server computer 112 taking some direct action to block the transaction and/or taking some action to instruct or prompt other devices to block the transaction. Also, in some embodiments the server computer 112 can be configured to inform a user or other entity (e.g., via an alert, push notification, email, text message, or the like that can be delivered to the user device 102 and/or the application server 116), that the transaction has been blocked. It should be understood that this example is illustrative, and therefore should not be construed as being limiting in any way.

If the server computer 112 determines, in operation 306, that the transaction has been approved, the method 300 can proceed to operation 310. At operation 310, the server computer 112 can obtain the second hash 138 from the user device 102. Thus, in some embodiments, the server computer 112 can instruct the user device 102 to send the second hash 138 if the user device 102 has indicated that the transaction has been approved. In some embodiments, as explained above, the user device 102 may send the second hash 138 without any request being made (e.g., upon approving a transaction, the user device 102 can be configured to create the second hash 138 and to send the second hash 138 to the server computer 112). Regardless of whether the second hash 138 is requested or not, operation 310 can correspond to the server computer 112 obtaining the second hash 138.

From operation 310, the method 300 can proceed to operation 312. At operation 312, the server computer 112 can determine if the hashes (e.g., the first hash 124 and the second hash 138) provided in operations 302 and 310 match one another. According to various embodiments, the server computer 112 does not possess the keys or other hash algorithms to determine if the hashes match one another, so the server computer 112 can perform a data file comparison between the first hash 124 and the second hash 138 to determine if the files are the same. This type of analysis can be very simple, efficient, and quick as a result. In theory, because the information hashed by the user device 102 to create the first hash 124 and the second hash 138 is the same, and because the same hash algorithm and/or private key is used by the user device to create the hash of that information, the first hash 124 and the second hash 138 should be identical if the transaction was actually requested by the user device 102.

Thus, it can be appreciated that various embodiments of the concepts and technologies disclosed herein can provide at least three layers of authentication performed by three different entities for a transaction. In particular, some embodiments of the concepts and technologies disclosed herein can include 1) successful authentication of the user device 102 by the application 114 to begin the transaction, 2) the user device 102 sending information that indicates that the transaction was authorized to the server computer 112 (e.g., as discussed with reference to operation 212 of FIG. 2), and 3) the server computer 112 determining that the hashes provided (e.g., in operations 302 and 310) match one another. It should be understood that this example is illustrative, and therefore should not be construed as being limiting in any way.

If the server computer 112 determines, in operation 312, that the hashes are match one another (e.g., are two files with identical contents), the method 300 can proceed to operation 308. At operation 308, the server computer 112 can block the transaction as explained above. In some contemplated embodiments, the server computer 112 can prompt the user device 102 or the application 114 to present an alert screen, a notification, or the like, at the user device 102 to inform a user or other entity that the transaction has been blocked. If the server computer 112 determines, in operation 312, that the hashes match, the method 300 can proceed to operation 314. At operation 314, the server computer 112 can instruct the application server 116 as to how to proceed (e.g., to allow the transaction). As explained above, the server computer 112 can allow a transaction by indicating, to the user device 102 the application 114, or both, that the transaction can proceed. In some embodiments, the functionality of operation 314 can correspond to the server computer 112 sending the application decision 130 to the application server 116, wherein the application decision 130 can indicate if the transaction has been allowed or blocked. Because the server computer 112 can allow the transaction in additional and/or alternative manners, it should be understood that this example is illustrative, and therefore should not be construed as being limiting in any way.

From operation 314, the method 300 can proceed to operation 316. The method 300 also can proceed to operation 316 from operation 308. The method 300 can end at operation 316.

Figure 4:
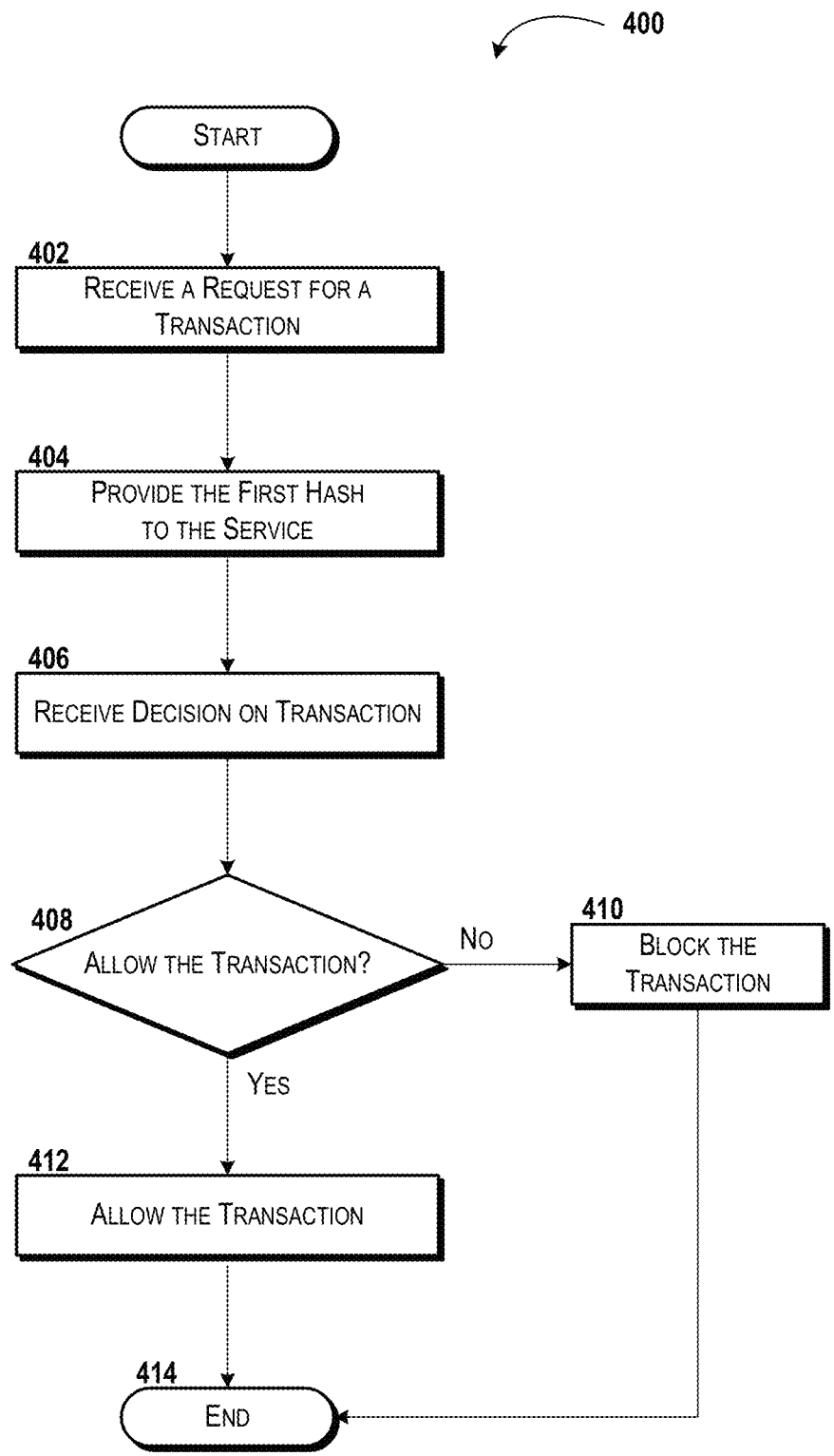
FIG. 4 is a flow diagram showing aspects of a method for obtaining validation of a transaction from a transaction validation service, according to an illustrative embodiment of the concepts and technologies described herein.

Turning now to FIG. 4, aspects of a method 400 for obtaining validation of a transaction from a transaction validation service 110 will be described in detail, according to an illustrative embodiment. For purposes of illustrating and describing the concepts of the present disclosure, the method 400 is described herein as being performed by the application server 116 via execution of one or more software modules such as, for example, the application 114. It should be understood that additional and/or alternative devices and/or network nodes can provide the functionality described herein via execution of one or more modules, applications, and/or other software including, but not limited to, the application 114. Thus, the illustrated embodiments are illustrative, and should not be viewed as being limiting in any way.

The method 400 begins at operation 402. At operation 402, the application server 116 can receive a request for a transaction. According to various embodiments of the concepts and technologies disclosed herein, the transaction can include various types of transactions such as, for example, requesting the sending of an email via an email application or email service; requesting a transfer or payment via a banking application or banking service; requesting a remote session via a desktop or computer sharing application or service; or requesting any other type of transaction for which a user may be authenticated in one way or another (e.g., via password/login information, etc.). As such, operation 402 can correspond to the application 114 receiving a request to perform a transaction such as sending an email, accessing an account, transferring money, making a payment, accessing a remote session, etc. Because other transactions and/or transaction types are illustrated and described herein, it should be understood that these examples above are merely illustrative of some contemplated transactions and therefore should not be construed as being limiting in any way.

In various embodiments of the concepts and technologies disclosed herein, the request received in operation 402 can be received with the first hash 124. If a request for a transaction is received with the first hash 124, the application 114 can be configured to recognize that transaction validation is to be provided (e.g., by interacting with the transaction validation service 110) for the transaction. In some other embodiments, the application 114 can require transaction validation and can instruct the user device 102 to send the first hash 124. Regardless of how the first hash 124 is received by the application 114, it can be appreciated that the application 114 can obtain the first hash 124 from the user device 102.

From operation 402, the method 400 can proceed to operation 404. At operation 404, the application server 116 can provide the first hash 124 to the server computer 112. In some embodiments, the providing of the first hash 124 to the server computer 112 can be understood by the server computer 112 as requesting validation of the transaction. It should be understood that the transaction can be identified by the application 114, as can the parties to the transaction such as, for example, the user device 102 and the application server 116. In some other embodiments, the application server 116 can request validation of the transaction and in response to that request (e.g., the application request 128), the server computer 112 can request the first hash 124 from the application server 116. Regardless of the timing and/or what entity requests (or does not request) the first hash 124, it should be understood that in operation 404, the application server 116 can provide the first hash 124 to the server computer 112.

From operation 404, the method 400 can proceed to operation 406. At operation 406, the application server 116 can obtain a decision on the transaction such as, for example, the validation decision 136 illustrated and described above. The validation decision 136 can instruct the application 114 as to whether to allow the transaction or not; whether to block the transaction or not; whether the transaction is validated or not; whether the transaction is verified or not; whether the transaction is authorized or not; combinations thereof; or the like. From operation 406, the method 400 can proceed to operation 408. At operation 408, the application server 116 can determine whether to allow the transaction. In some embodiments, this determination is based on the application decision 130 obtained in operation 406.

If the application server 116 determines, in operation 408, that the transaction is not to be allowed, the method 400 can proceed to operation 410. At operation 410, the application server 116 can block the transaction. In some embodiments, the application server 116 can be configured to block the transaction and/or to issue instructions (e.g., to the user device 102 and/or other devices or entities) to block or interrupt the transaction. In some embodiments, for example, the application server 116 can block the transaction by instructing the user device 102 to disconnect from the application server 116, by instructing the transaction validation application 108 to stop the transaction, by instructing the application 114 to stop the transaction, by disconnecting the application server 116 from the user device 102, by triggering or requesting other devices to block the transaction, combinations thereof, or the like. As such, it should be understood that the functionality of operation 408 can include the application server 116 taking some direct action to block the transaction and/or the application server 116 taking some action to instruct or prompt other devices to block the transaction. Because the transaction can be interrupted or stopped by the application server 116 in additional and/or alternative manners, it should be understood that these examples are illustrative, and therefore should not be construed as being limiting in any way.

If the application server 116 determines, in operation 408, that the transaction is to be allowed, the method 400 can proceed to operation 412. At operation 412, the application server 116 can allow the transaction. In various embodiments of operation 412, the application server 116 can allow the transaction in operation 412 by not interrupting the transaction (thereby allowing the transaction to proceed). In some other embodiments, the functionality of operation 412 can correspond to the application server 116 indicating to the user device 102 that the transaction has been allowed and/or actively resuming the transaction (e.g., the transaction may be paused in some embodiments while verification and/or validation occurs). Because the application server 116 can allow the transaction in additional and/or alternative manners, it should be understood that this example is illustrative, and therefore should not be construed as being limiting in any way.

From operation 412, the method 400 can proceed to operation 414. The method 400 also can proceed to operation 414 from operation 410. The method 400 can end at operation 414.

Figure 5A:
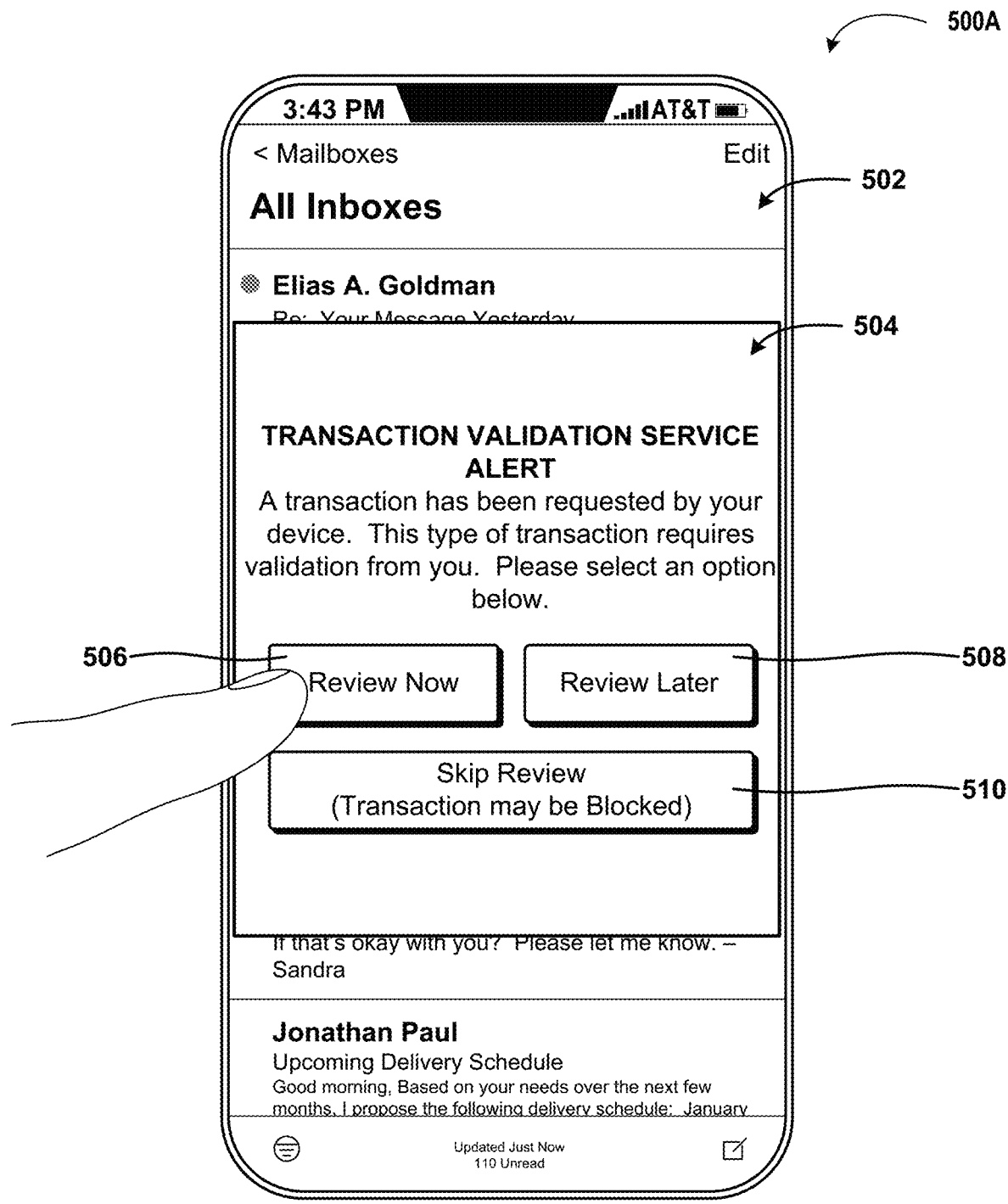
FIGS. 5A-5B are user interface diagrams showing various screen displays for interacting with a transaction validation service, according to some illustrative embodiments of the concepts and technologies described herein.
Figure 5B:
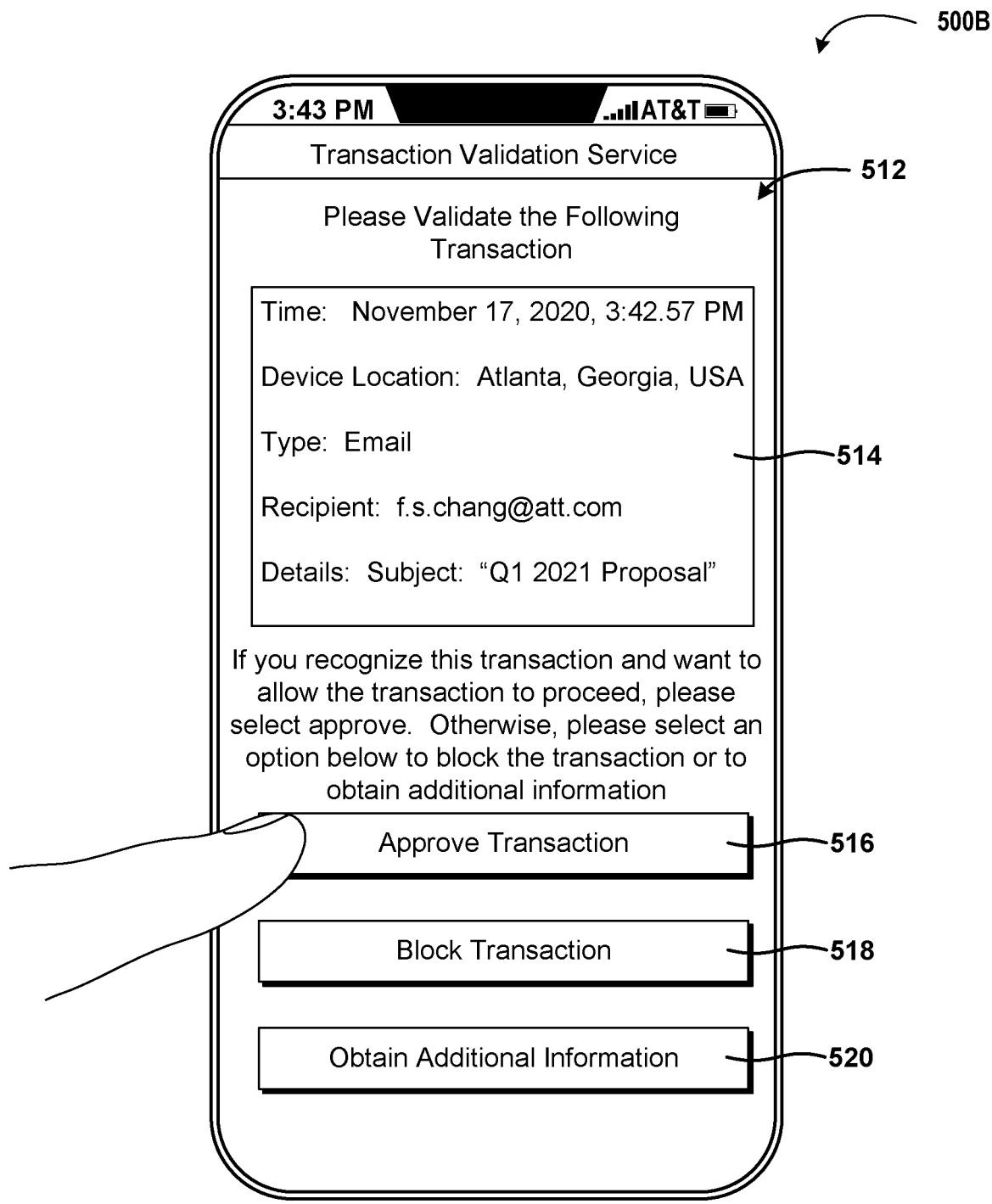

FIGS. 5A-5B are user interface ("UI") diagrams showing aspects of UIs for using and/or interacting with transaction validation service 110 and/or the transaction validation application 108, according to some illustrative embodiments. FIG. 5A shows an illustrative screen display 500A. According to some embodiments of the concepts and technologies described herein, the screen display 500A can be generated by a device such as the user device 102 via interactions with the transaction validation service 110 and/ or the transaction validation application 108. In particular, according to various embodiments, the user device 102 can generate the screen display 500A and/or other screen displays in conjunction with and/or based upon interactions with the transaction validation application 108 described herein, which can be configured to render the screen display 500A using data generated at the user device 102 and/or using data provided by the transaction validation service 110. It should be appreciated that the UI diagram illustrated in FIG. 5A is illustrative of one contemplated example of the UIs that can be generated and/or displayed in accordance with the concepts and technologies disclosed herein, and therefore should not be construed as being limited in any way.

According to various embodiments, the screen display 500A can be presented, for example, when a validation request 134 is sent to the user device 102 as illustrated and described in FIG. 1 and FIG. 2. Because the screen display 500A illustrated in FIG. 5A can be displayed at additional and/or alternative times, it should be understood that these examples are illustrative and therefore should not be construed as being limiting in any way.

The screen display 500A can include various menus and/or menu options (not shown in FIG. 5A). The screen display 500A also can include a transaction validation alert window 502. The transaction validation alert window 502 can be configured to inform a user (or other entity) that a transaction validation has been requested and to give the user or other entity to opportunity to approve or block the transaction. Thus, the transaction validation alert window 502 can include an explanation 504 of the request for validation and/or can provide explanation of the options the user or other entity has in response to the request for validation. Of course, as noted above, some embodiments of the concepts and technologies disclosed herein do not rely on user input and as such, it can be appreciated that the functionality illustrated and described with reference to FIG. 5A is illustrative of one embodiment and should not be construed as being limiting in any way.

The transaction validation alert window 502 can include a UI control 506 for enabling a review of transaction details associated with the transaction for which validation is being requested via the transaction validation alert window 502. In response to detecting selection of the UI control 506, the user device 102 can be configured to present additional information associated with the transaction, as is shown in FIG. 5B. Because additional information associated with the transaction can be shown in additional and/or alternative formats, and because the additional information associated with the transaction can be shown at additional and/or alternative times, it should be understood that this embodiment is illustrative.

The transaction validation alert window 502 can also include a UI control 508 that, if selected, can cause the user device 102 to archive the transaction review functionality until a later time. In some embodiments, selection of the UI control 508 can cause the user device 102 to hide the transaction validation alert window 502 for a set amount of time, to pause the transaction, and/or to take other actions, if desired. The transaction validation alert window 502 also can include a UI control 510 to skip review and/or approval of the transaction. According to various embodiments of the concepts and technologies disclosed herein, selection of the UI control 510 can cause the user device 102 to skip review. It can be appreciated that in some embodiments, selection of the UI control 510 can be understood by the transaction validation service 110 as a failure to approve the transaction and therefore can trigger blocking of the transaction. In some embodiments, however, the user or other entity may elect to skip the review (e.g., when driving, or the like) and/or for other purposes. In some embodiments, selection of the UI control 510 can cause the user device 102 to block the transaction. Because additional or alternative controls can be included in the transaction validation alert window 502, it should be understood that the example embodiment shown in FIG. 5A is illustrative and therefore should not be construed as being limiting in any way.

FIG. 5B shows an illustrative screen display 500B. According to some embodiments of the concepts and technologies described herein, the screen display 500B can be generated by a device such as the user device 102 via interactions with the transaction validation service 110 and/or the transaction validation application 108. In particular, according to various embodiments, the user device 102 can generate the screen display 500B and/or other screen displays in conjunction with and/or based upon interactions with the transaction validation application 108 described herein, which can be configured to render the screen display 500B using data generated at the user device 102 and/or using data provided by the transaction validation service 110. It should be appreciated that the UI diagram illustrated in FIG. 5B is illustrative of one contemplated example of the UIs that can be generated and/or displayed in accordance with the concepts and technologies disclosed herein, and therefore should not be construed as being limiting in any way.

According to various embodiments, the screen display 500B can be presented, for example, selection of the UI control 506 illustrated and described above with reference to FIG. 5A. Because the screen display 500B illustrated in FIG. 5B can be displayed at additional and/or alternative times, it should be understood that this example is illustrative and therefore should not be construed as being limiting in any way.

The screen display 500B can include various menus and/or menu options (not shown in FIG. 5B). The screen display 500B also can include a transaction details display screen 512. The transaction details display screen 512 can be configured to inform a user (or other entity) about details of the transaction for which validation has been requested and to give the user or other entity to opportunity to approve or block the transaction. Thus, the transaction details display screen 512 can include a field or explanation ("field") 514, which can include details of the transaction. Of course, as noted above, some embodiments of the concepts and technologies disclosed herein do not rely on user input and as such, it can be appreciated that the functionality illustrated and described with reference to FIG. 5B is illustrative of one embodiment and should not be construed as being limiting in any way.

In the illustrated embodiment, the field 514 indicates the time, device location, type of transaction, and other transaction particulars such as, in the illustrated embodiment, a recipient of an email message being sent, a subject line for the email message, and the like. It should be understood that this example is illustrative, and therefore should not be construed as being limiting in any way. The transaction details display screen 512 can include a UI control 516 for approving the transaction. In some embodiments, selection of the UI control 516 can launch a secondary authentication screen (e.g., a fingerprint reading screen, a facial feature verification (e.g., faceID) screen, a voiceprint verification screen, combinations thereof, or the like). Thus, it can be appreciated that the concepts and technologies disclosed herein can provide multi-factor authentication of a user or other entity when validating (or invalidating) a transaction. In response to detecting selection of the UI control 516, the user device 102 also can be configured to create a validation decision 136, e.g., a validation decision 136 that indicates that the transaction is to be allowed. Because additional actions can be taken in response to detecting selection of the UI control 516, it should be understood that this example is illustrative and should not be construed as being limiting in any way.

The transaction details display screen 512 can also include a UI control 518 that, if selected, can cause the user device 102 to block the transaction and/or to take steps to block the transaction. Thus, in some embodiments of the concepts and technologies disclosed herein, selection of the UI control 518 can cause the user device 102 to create a validation decision 136 that indicates that the transaction is not authorized, to indicate that the transaction should be blocked, to stop the transaction, combinations thereof, or the like. The transaction details display screen 512 also can include a UI control 520 to obtain additional information associated with the transaction. According to various embodiments of the concepts and technologies disclosed herein, selection of the UI control 520 can cause the user device 102 to obtain additional information associated with the transaction to enable the user or other entity (or the transaction validation application 108) to determine if the transaction is authorized or unauthorized. Because additional or alternative controls can be included in the transaction details display screen 512, it should be understood that the example embodiment shown in FIG. 5B is illustrative and therefore should not be construed as being limiting in any way.

Figure 6:
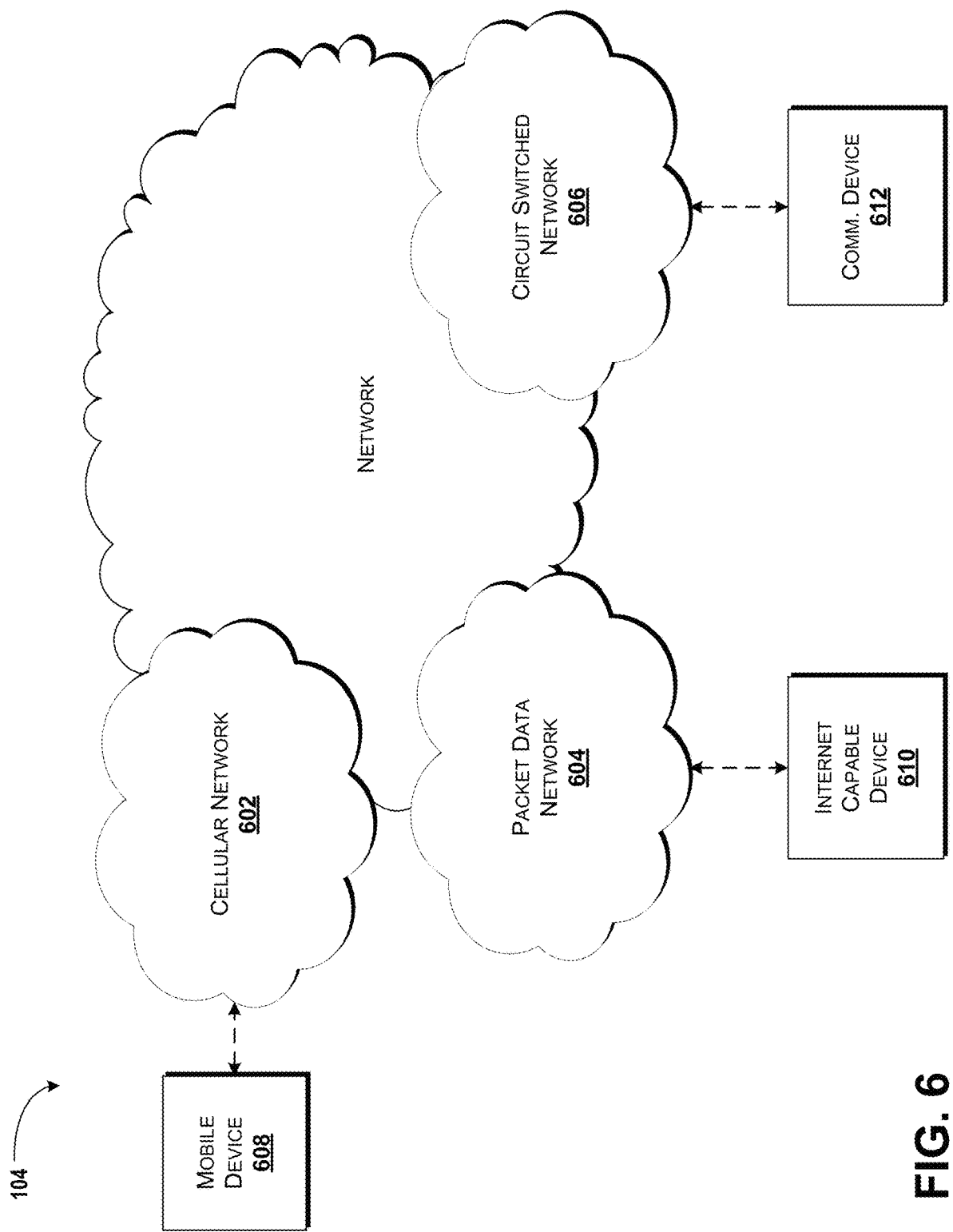
FIG. 6 schematically illustrates a network, according to an illustrative embodiment of the concepts and technologies described herein.

Turning now to FIG. 6, additional details of the network 104 are illustrated, according to an illustrative embodiment. The network 104 includes a cellular network 602, a packet data network 604, for example, the Internet, and a circuit switched network 606, for example, a publicly switched telephone network ("PSTN"). The cellular network 602 includes various components such as, but not limited to, base transceiver stations ("BTSs"), Node-B's or e-Node-B's, base station controllers ("BSCs"), radio network controllers ("RNCs"), mobile switching centers ("MSCs"), mobile management entities ("MMEs"), short message service centers ("SMSCs"), multimedia messaging service centers ("MMSCs"), home location registers ("HLRs"), home subscriber servers ("HSSs"), visitor location registers ("VLRs"), charging platforms, billing platforms, voicemail platforms, GPRS core network components, location service nodes, an IP Multimedia Subsystem ("IMS"), and the like. The cellular network 602 also includes radios and nodes for receiving and transmitting voice, data, and combinations thereof to and from radio transceivers, networks, the packet data network 604, and the circuit switched network 606.

A mobile communications device 608, such as, for example, a cellular telephone, a user equipment, a mobile terminal, a PDA, a laptop computer, a handheld computer, and combinations thereof, can be operatively connected to the cellular network 602. The cellular network 602 can be configured as a 2G GSM network and can provide data communications via GPRS and/or EDGE. Additionally, or alternatively, the cellular network 602 can be configured as a 3G UMTS network and can provide data communications via the HSPA protocol family, for example, HSDPA, EUL (also referred to as HSDPA), and HSPA+. The cellular network 602 also is compatible with 4G mobile communications standards as well as evolved and future mobile standards.

The packet data network 604 includes various devices, for example, servers, computers, databases, and other devices in communication with one another, as is generally known. The packet data network 604 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "links" in the retrieved files, as is generally known. In some embodiments, the packet data network 604 includes or is in communication with the Internet. The circuit switched network 606 includes various hardware and software for providing circuit switched communications. The circuit switched network 606 may include, or may be, what is often referred to as a plain old telephone system (POTS). The functionality of a circuit switched network 606 or other circuit-switched network are generally known and will not be described herein in detail.

The illustrated cellular network 602 is shown in communication with the packet data network 604 and a circuit switched network 606, though it should be appreciated that this is not necessarily the case. One or more Internet-capable devices 610, for example, a PC, a laptop, a portable device, or another suitable device, can communicate with one or more cellular networks 602, and devices connected thereto, through the packet data network 604. It also should be appreciated that the Internet-capable device 610 can communicate with the packet data network 604 through the circuit switched network 606, the cellular network 602, and/or via other networks (not illustrated).

As illustrated, a communications device 612, for example, a telephone, facsimile machine, modem, computer, or the like, can be in communication with the circuit switched network 606, and therethrough to the packet data network 604 and/or the cellular network 602. It should be appreciated that the communications device 612 can be an Internet-capable device, and can be substantially similar to the Internet-capable device 610. In the specification, the network 104 is used to refer broadly to any combination of the networks 602, 604, 606. It should be appreciated that substantially all of the functionality described with reference to the network 104 can be performed by the cellular network 602, the packet data network 604, and/or the circuit switched network 606, alone or in combination with other networks, network elements, and the like.

Figure 7:
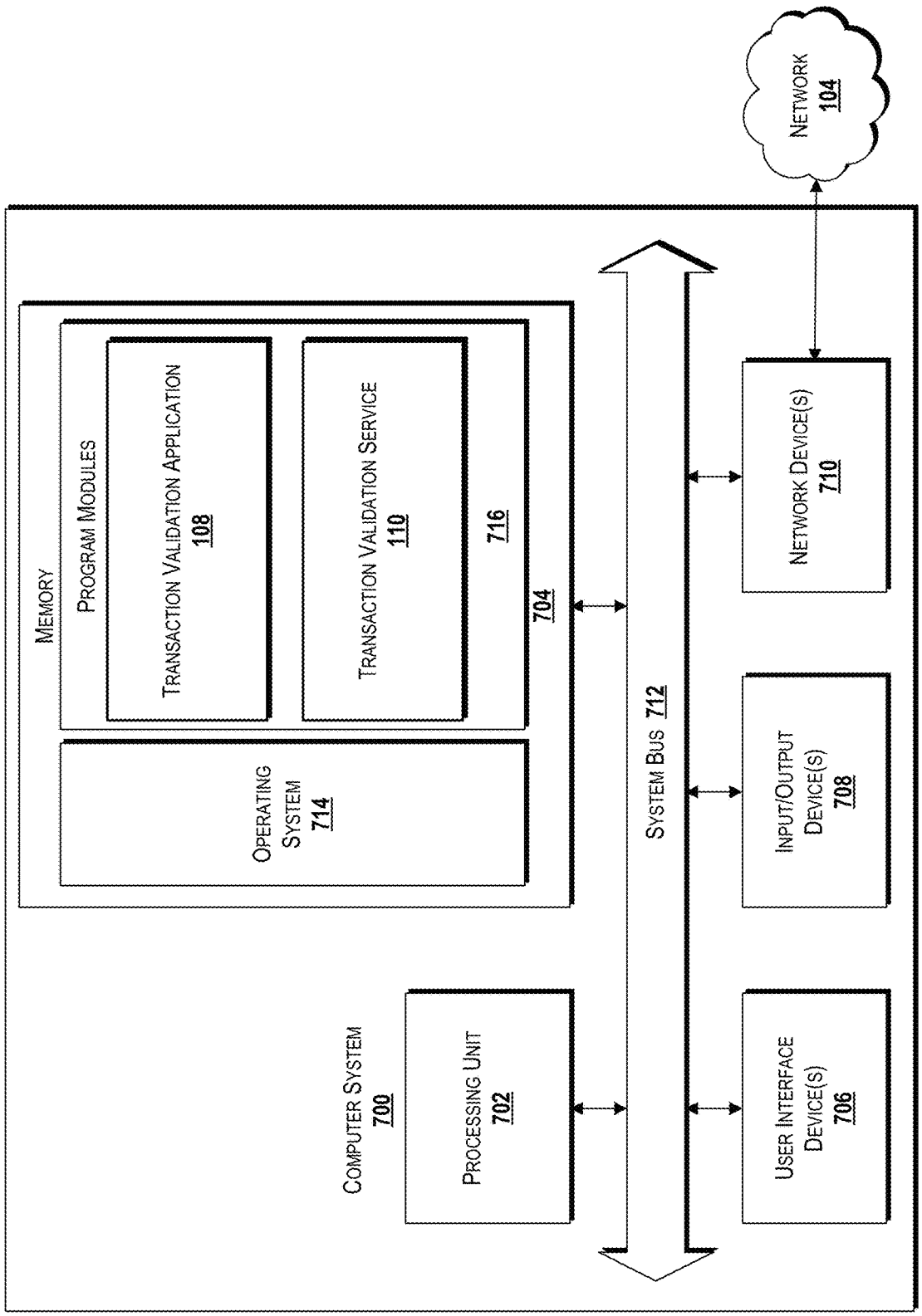
FIG. 7 is a block diagram illustrating an example computer system configured to provide and/or interact with a transaction validation service, according to some illustrative embodiments of the concepts and technologies described herein.

FIG. 7 is a block diagram illustrating a computer system 700 configured to provide the functionality described herein for providing and/or interacting with a transaction validation service, in accordance with various embodiments of the concepts and technologies disclosed herein. The computer system 700 includes a processing unit 702, a memory 704, one or more user interface devices 706, one or more input/output ("I/O") devices 708, and one or more network devices 710, each of which is operatively connected to a system bus 712. The bus 712 enables bi-directional communication between the processing unit 702, the memory 704, the user interface devices 706, the I/O devices 708, and the network devices 710.

The processing unit 702 may be a standard central processor that performs arithmetic and logical operations, a more specific purpose programmable logic controller ("PLC"), a programmable gate array, or other type of processor known to those skilled in the art and suitable for controlling the operation of the server computer. As used herein, the word "processor" and/or the phrase "processing unit" when used with regard to any architecture or system can include multiple processors or processing units distributed across and/or operating in parallel in a single machine or in multiple machines. Furthermore, processors and/or processing units can be used to support virtual processing environments. Processors and processing units also can include state machines, application-specific integrated circuits ("ASICs"), combinations thereof, or the like. Because processors and/or processing units are generally known, the processors and processing units disclosed herein will not be described in further detail herein.

The memory 704 communicates with the processing unit 702 via the system bus 712. In some embodiments, the memory 704 is operatively connected to a memory controller (not shown) that enables communication with the processing unit 702 via the system bus 712. The memory 704 includes an operating system 714 and one or more program modules 716. The operating system 714 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, iOS, and/or LEOPARD families of operating systems from APPLE CORPORATION, the FREEBSD family of operating systems, the SOLARIS family of operating systems from ORACLE CORPORATION, other operating systems, and the like.

The program modules 716 may include various software and/or program modules described herein. In some embodiments, for example, the program modules 716 include the transaction validation application 108, the transaction validation service 110, and/or the application 114. These and/or other programs can be embodied in computer-readable media containing instructions that, when executed by the processing unit 702, perform one or more of the methods 200, 300, and 400 described in detail above with respect to FIGS. 2-4 and/or other functionality as illustrated and described herein. It can be appreciated that, at least by virtue of the instructions embodying the methods 200, 300, and 400, and/or other functionality illustrated and described herein being stored in the memory 704 and/or accessed and/or executed by the processing unit 702, the computer system 700 is a special-purpose computing system that can facilitate providing the functionality illustrated and described herein. According to embodiments, the program modules 716 may be embodied in hardware, software, firmware, or any combination thereof. Although not shown in FIG. 7, it should be understood that the memory 704 also can be configured to store the transaction data 118, the application data 126, and the validation data 132, and/or components thereof (e.g., the transaction request 122, the first hash 124, the application request 128, the application decision 130, the validation request 134, the validation decision 136, the second hash 138, and/or the other information) and/or other data, if desired.

By way of example, and not limitation, computer-readable media may include any available computer storage media or communication media that can be accessed by the computer system 700. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 700. In the claims, the phrase "computer storage medium" and variations thereof does not include waves or signals per se and/or communication media.

The user interface devices 706 may include one or more devices with which a user accesses the computer system 700. The user interface devices 706 may include, but are not limited to, computers, servers, personal digital assistants, cellular phones, or any suitable computing devices. The I/O devices 708 enable a user to interface with the program modules 716. In one embodiment, the I/O devices 708 are operatively connected to an I/O controller (not shown) that enables communication with the processing unit 702 via the system bus 712. The I/O devices 708 may include one or more input devices, such as, but not limited to, a keyboard, a mouse, or an electronic stylus. Further, the I/O devices 708 may include one or more output devices, such as, but not limited to, a display screen or a printer.

The network devices 710 enable the computer system 700 to communicate with other networks or remote systems via a network, such as the network 104. Examples of the network devices 710 include, but are not limited to, a modem, a radio frequency ("RF") or infrared ("IR") transceiver, a telephonic interface, a bridge, a router, or a network card. The network 104 may include a wireless network such as, but not limited to, a Wireless Local Area Network ("WLAN") such as a WI-FI network, a Wireless Wide Area Network ("WWAN"), a Wireless Personal Area Network ("WPAN") such as BLUETOOTH, a Wireless Metropolitan Area Network ("WMAN") such as a WiMAX network, or a cellular network. Alternatively, the network 104 may be a wired network such as, but not limited to, a Wide Area Network ("WAN") such as the Internet, a Local Area Network ("LAN") such as the Ethernet, a wired Personal Area Network ("PAN"), or a wired Metropolitan Area Network ("MAN").

Figure 8:
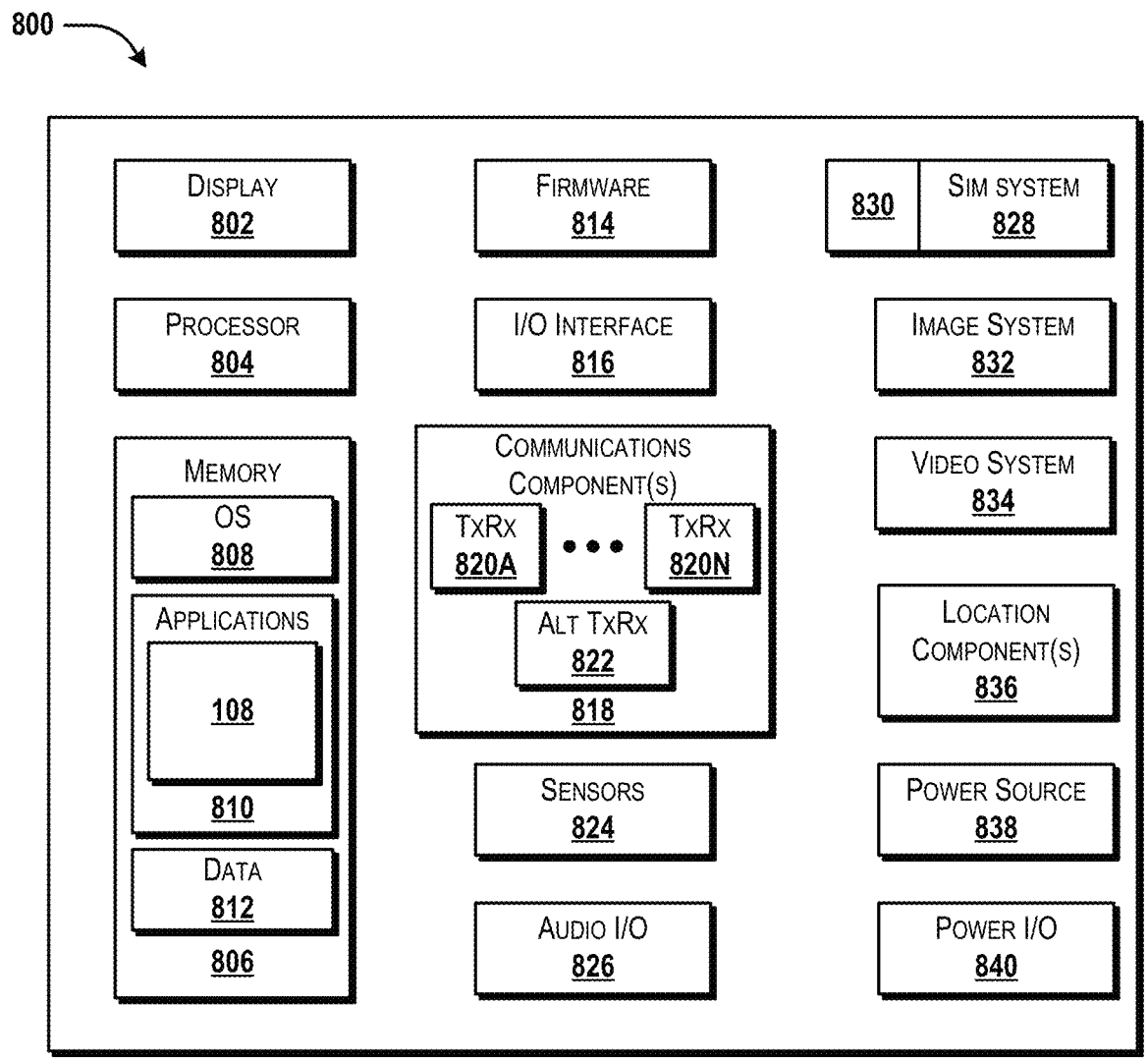
FIG. 8 is a block diagram illustrating an example mobile device configured to interact with a transaction validation service, according to some illustrative embodiments of the concepts and technologies described herein.

Turning now to FIG. 8, an illustrative mobile device 800 and components thereof will be described. In some embodiments, the user device 102 described above with reference to FIGS. 1-5B can be configured as and/or can have an architecture similar or identical to the mobile device 800 described herein in FIG. 8. It should be understood, however, that the user device 102 may or may not include the functionality described herein with reference to FIG. 8. While connections are not shown between the various components illustrated in FIG. 8, it should be understood that some, none, or all of the components illustrated in FIG. 8 can be configured to interact with one another to carry out various device functions. In some embodiments, the components are arranged so as to communicate via one or more busses (not shown). Thus, it should be understood that FIG. 8 and the following description are intended to provide a general understanding of a suitable environment in which various aspects of embodiments can be implemented, and should not be construed as being limiting in any way.

As illustrated in FIG. 8, the mobile device 800 can include a display 802 for displaying data. According to various embodiments, the display 802 can be configured to display various graphical user interface ("GUI") elements such as, for example, elements for alerting about a transaction validation, for obtaining information relating to validation of transactions, user interfaces for enabling validation of transactions, for obtaining biometric and/or other types of authentication information from a user or other entity (e.g., obtaining fingerprint authentication, obtaining facial characteristics for facial recognition, obtaining a voiceprint for voice authentication, etc.), for presenting or obtaining transaction information and/or details, text, images, video, virtual keypads and/or keyboards, messaging data, notification messages, metadata, internet content, device status, time, date, calendar data, device preferences, map and location data, combinations thereof, and/or the like. The mobile device 800 also can include a processor 804 and a memory or other data storage device ("memory") 806. The processor 804 can be configured to process data and/or can execute computer-executable instructions stored in the memory 806. The computer-executable instructions executed by the processor 804 can include, for example, an operating system 808, one or more applications 810 such as the transaction validation application 108, the transaction validation service 110, the application 114, other computer-executable instructions stored in a memory 806, or the like. In some embodiments, the applications 810 also can include a UI application (not illustrated in FIG. 8).

The UI application can interface with the operating system 808, such as the operating system 106 shown in FIG. 1, to facilitate user interaction with functionality and/or data stored at the mobile device 800 and/or stored elsewhere. In some embodiments, the operating system 808 can include a member of the SYMBIAN OS family of operating systems from SYMBIAN LIMITED, a member of the WINDOWS MOBILE OS and/or WINDOWS PHONE OS families of operating systems from MICROSOFT CORPORATION, a member of the PALM WEBOS family of operating systems from HEWLETT PACKARD CORPORATION, a member of the BLACKBERRY OS family of operating systems from RESEARCH IN MOTION LIMITED, a member of the IOS family of operating systems from APPLE INC., a member of the ANDROID OS family of operating systems from GOOGLE INC., and/or other operating systems. These operating systems are merely illustrative of some contemplated operating systems that may be used in accordance with various embodiments of the concepts and technologies described herein and therefore should not be construed as being limiting in any way.

The UI application can be executed by the processor 804 to aid a user in entering content, viewing transaction details, approving or blocking transactions, authenticating with a device to send hashes, configuring settings, manipulating address book content and/or settings, multimode interaction, interacting with other applications 810, and otherwise facilitating user interaction with the operating system 808, the applications 810, and/or other types or instances of data 812 that can be stored at the mobile device 800. The data 812 can include, for example, the transaction data 118, the application data 126, and the validation data 132, and/or components thereof (e.g., the transaction request 122, the first hash 124, the application request 128, the application decision 130, the validation request 134, the validation decision 136, the second hash 138, and/or the other information), and/or other data including applications or program modules. According to various embodiments, the data 812 can include, for example, presence applications, visual voice mail applications, messaging applications, text-to-speech and speech-to-text applications, add-ons, plug-ins, email applications, music applications, video applications, camera applications, location-based service applications, power conservation applications, game applications, productivity applications, entertainment applications, enterprise applications, combinations thereof, and the like. The applications 810, the data 812, and/or portions thereof can be stored in the memory 806 and/or in a firmware 814, and can be executed by the processor 804.

It can be appreciated that, at least by virtue of storage of the instructions corresponding to the applications 810 and/or other instructions embodying other functionality illustrated and described herein in the memory 806, and/or by virtue of the instructions corresponding to the applications 810 and/or other instructions embodying other functionality illustrated and described herein being accessed and/or executed by the processor 804, the mobile device 800 is a special-purpose mobile device that can facilitate providing the functionality illustrated and described herein. The firmware 814 also can store code for execution during device power up and power down operations. It can be appreciated that the firmware 814 can be stored in a volatile or non-volatile data storage device including, but not limited to, the memory 806 and/or a portion thereof.

The mobile device 800 also can include an input/output ("I/O") interface 816. The I/O interface 816 can be configured to support the input/output of data such as location information, the transaction data 118, the application data 126, and the validation data 132, and/or components thereof (e.g., the transaction request 122, the first hash 124, the application request 128, the application decision 130, the validation request 134, the validation decision 136, the second hash 138, and/or the other information), location information, hashes (e.g., the first hash 124 and/or the second hash 138), user information, organization information, presence status information, user IDs, passwords, and application initiation (start-up) requests. In some embodiments, the I/O interface 816 can include a hardwire connection such as a universal serial bus ("USB") port, a mini-USB port, a micro-USB port, an audio jack, a PS2 port, an IEEE 1394 ("FIREWIRE") port, a serial port, a parallel port, an Ethernet (RJ45 or RJ48) port, a telephone (RJ11 or the like) port, a proprietary port, combinations thereof, or the like.

In some embodiments, the mobile device 800 can be configured to synchronize with another device to transfer content to and/or from the mobile device 800. In some embodiments, the mobile device 800 can be configured to receive updates to one or more of the applications 810 via the I/O interface 816, though this is not necessarily the case. In some embodiments, the I/O interface 816 accepts I/O devices such as keyboards, keypads, mice, interface tethers, printers, plotters, external storage, touch/multi-touch screens, touch pads, trackballs, joysticks, microphones, remote control devices, displays, projectors, medical equipment (e.g., stethoscopes, heart monitors, and other health metric monitors), modems, routers, external power sources, docking stations, combinations thereof, and the like. It should be appreciated that the I/O interface 816 may be used for communications between the mobile device 800 and a network device or local device.

The mobile device 800 also can include a communications component 818. The communications component 818 can be configured to interface with the processor 804 to facilitate wired and/or wireless communications with one or more networks such as the network 104 described herein. In some embodiments, other networks include networks that utilize non-cellular wireless technologies such as WI-FI or WIMAX. In some embodiments, the communications component 818 includes a multimode communications subsystem for facilitating communications via the cellular network and one or more other networks.

The communications component 818, in some embodiments, includes one or more transceivers. The one or more transceivers, if included, can be configured to communicate over the same and/or different wireless technology standards with respect to one another. For example, in some embodiments one or more of the transceivers of the communications component 818 may be configured to communicate using GSM, CDMAONE, CDMA2000, LTE, and various other 2G, 2.5G, 3G, 4G, and greater generation technology standards. Moreover, the communications component 818 may facilitate communications over various channel access methods (which may or may not be used by the aforementioned standards) including, but not limited to, TDMA, FDMA, W-CDMA, OFDM, SDMA, and the like.

In addition, the communications component 818 may facilitate data communications using GPRS, EDGE, the HSPA protocol family including HSDPA, EUL or otherwise termed HSDPA, HSPA+, and various other current and future wireless data access standards. In the illustrated embodiment, the communications component 818 can include a first transceiver ("TxRx") 820A that can operate in a first communications mode (e.g., GSM). The communications component 818 also can include an $N^{th}$ transceiver ("TxRx") 820N that can operate in a second communications mode relative to the first transceiver 820A (e.g., UMTS). While two transceivers 820A-N (hereinafter collectively and/or generically referred to as "transceivers 820") are shown in FIG. 8, it should be appreciated that less than two, two, and/or more than two transceivers 820 can be included in the communications component 818.

The communications component 818 also can include an alternative transceiver ("Alt TxRx") 822 for supporting other types and/or standards of communications. According to various contemplated embodiments, the alternative transceiver 822 can communicate using various communications technologies such as, for example, WI-FI, WIMAX, BLUETOOTH, infrared, infrared data association ("IRDA"), near field communications ("NFC"), other RF technologies, combinations thereof, and the like. In some embodiments, the communications component 818 also can facilitate reception from terrestrial radio networks, digital satellite radio networks, internet-based radio service networks, combinations thereof, and the like. The communications component 818 can process data from a network such as the Internet, an intranet, a broadband network, a WI-FI hotspot, an Internet service provider ("ISP"), a digital subscriber line ("DSL") provider, a broadband provider, combinations thereof, or the like.

The mobile device 800 also can include one or more sensors 824. The sensors 824 can include temperature sensors, light sensors, air quality sensors, movement sensors, orientation sensors, noise sensors, proximity sensors, or the like. As such, it should be understood that the sensors 824 can include, but are not limited to, accelerometers, magnetometers, gyroscopes, infrared sensors, noise sensors, microphones, combinations thereof, or the like. Additionally, audio capabilities for the mobile device 800 may be provided by an audio I/O component 826. The audio I/O component 826 of the mobile device 800 can include one or more speakers for the output of audio signals, one or more microphones for the collection and/or input of audio signals, and/or other audio input and/or output devices.

The illustrated mobile device 800 also can include a SIM system 828. The SIM system 828 can include a universal SIM ("USIM"), a universal integrated circuit card ("UICC") and/or other identity devices. The SIM system 828 can include and/or can be connected to or inserted into an interface such as a slot interface 830. In some embodiments, the slot interface 830 can be configured to accept insertion of other identity cards or modules for accessing various types of networks. Additionally, or alternatively, the slot interface 830 can be configured to accept multiple subscriber identity cards. Because other devices and/or modules for identifying users and/or the mobile device 800 are contemplated, it should be understood that these embodiments are illustrative, and should not be construed as being limiting in any way.

The mobile device 800 also can include an image capture and processing system 832 ("image system"). The image system 832 can be configured to capture or otherwise obtain photos, videos, and/or other visual information. As such, the image system 832 can include cameras, lenses, charge-coupled devices ("CCDs"), combinations thereof, or the like. The mobile device 800 may also include a video system 834. The video system 834 can be configured to capture, process, record, modify, and/or store video content. Photos and videos obtained using the image system 832 and the video system 834, respectively, may be added as message content to an MMS message, email message, and sent to another mobile device. The video and/or photo content also can be shared with other devices via various types of data transfers via wired and/or wireless communication devices as described herein.

The mobile device 800 also can include one or more location components 836. The location components 836 can be configured to send and/or receive signals to determine a geographic location of the mobile device 800. According to various embodiments, the location components 836 can send and/or receive signals from global positioning system ("GPS") devices, assisted-GPS ("A-GPS") devices, WI-FI/WIMAX and/or cellular network triangulation data, combinations thereof, and the like. The location component 836 also can be configured to communicate with the communications component 818 to retrieve triangulation data for determining a location of the mobile device 800. In some embodiments, the location component 836 can interface with cellular network nodes, telephone lines, satellites, location transmitters and/or beacons, wireless network transmitters and receivers, combinations thereof, and the like. In some embodiments, the location component 836 can include and/or can communicate with one or more of the sensors 824 such as a compass, an accelerometer, and/or a gyroscope to determine the orientation of the mobile device 800. Using the location component 836, the mobile device 800 can generate and/or receive data to identify its geographic location, or to transmit data used by other devices to determine the location of the mobile device 800. The location component 836 may include multiple components for determining the location and/or orientation of the mobile device 800.

The illustrated mobile device 800 also can include a power source 838. The power source 838 can include one or more batteries, power supplies, power cells, and/or other power subsystems including alternating current ("AC") and/or direct current ("DC") power devices. The power source 838 also can interface with an external power system or charging equipment via a power I/O component 840. Because the mobile device 800 can include additional and/or alternative components, the above embodiment should be understood as being illustrative of one possible operating environment for various embodiments of the concepts and technologies described herein. The described embodiment of the mobile device 800 is illustrative, and should not be construed as being limiting in any way.

Figure 9:
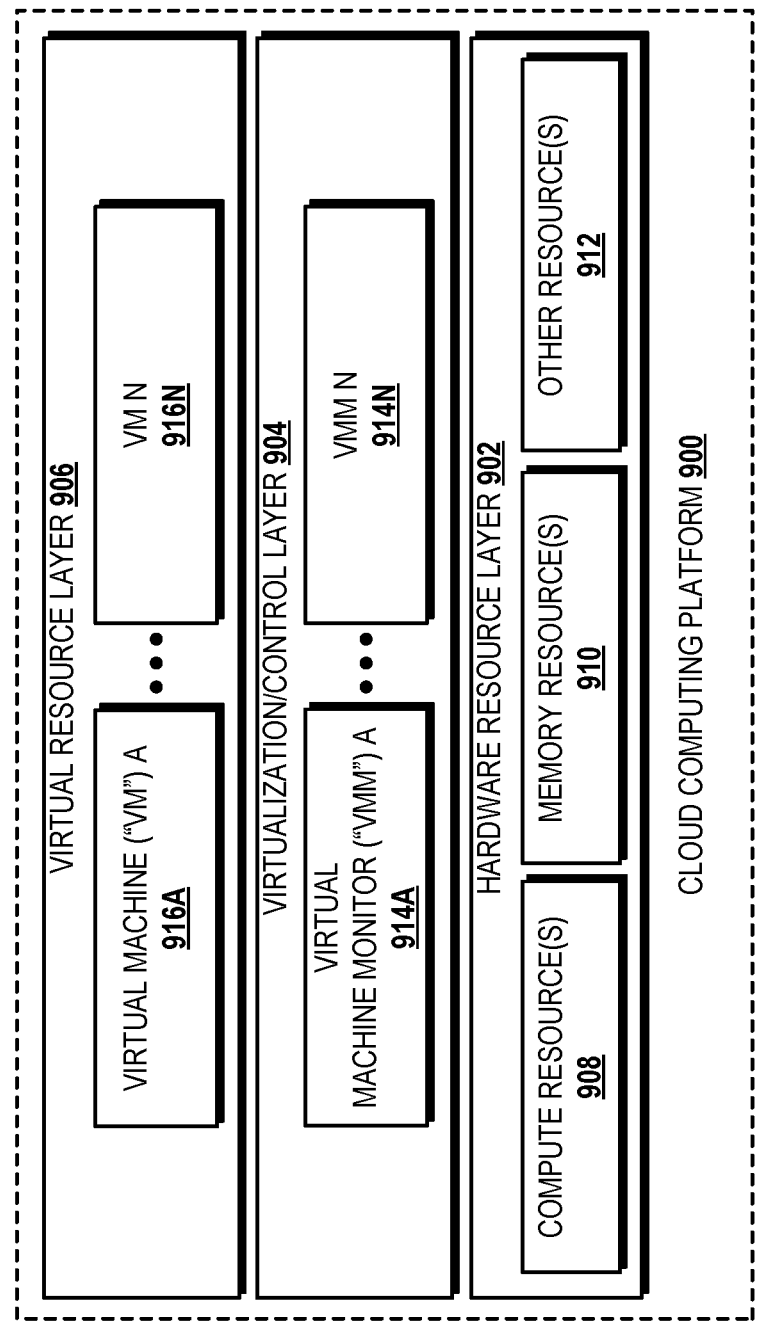
FIG. 9 is a diagram illustrating a computing environment capable of implementing aspects of the concepts and technologies disclosed herein, according to some illustrative embodiments of the concepts and technologies described herein.

FIG. 9 illustrates an illustrative cloud computing platform 900 capable of executing the software components described herein for providing and/or interacting with a transaction validation service 110. Thus, it can be appreciated that in some embodiments of the concepts and technologies disclosed herein, the cloud computing platform 900 illustrated in FIG. 9 can be used to provide the functionality described herein with respect to the user device 102, the server computer 112, and/or the application server 116.

The cloud computing platform 900 thus may be utilized to execute any aspects of the software components presented herein. Thus, according to various embodiments of the concepts and technologies disclosed herein, the transaction validation application 108, the transaction validation service 110, and/or the application 114 can be implemented, at least in part, on or by elements included in the cloud computing platform 900 illustrated and described herein. Those skilled in the art will appreciate that the illustrated cloud computing platform 900 is a simplification of but only one possible implementation of an illustrative cloud computing platform, and as such, the cloud computing platform 900 should not be construed as being limiting in any way.

In the illustrated embodiment, the cloud computing platform 900 can include a hardware resource layer 902, a virtualization/control layer 904, and a virtual resource layer 906. These layers and/or other layers can be configured to cooperate with each other and/or other elements of the cloud computing platform 900 to perform operations as will be described in detail herein. While connections are shown between some of the components illustrated in FIG. 9, it should be understood that some, none, or all of the components illustrated in FIG. 9 can be configured to interact with one another to carry out various functions described herein. In some embodiments, the components are arranged so as to communicate via one or more networks such as, for example, the network 104 illustrated and described hereinabove (not shown in FIG. 9). Thus, it should be understood that FIG. 9 and the following description are intended to provide a general understanding of a suitable environment in which various aspects of embodiments can be implemented, and should not be construed as being limiting in any way.

The hardware resource layer 902 can provide hardware resources. In the illustrated embodiment, the hardware resources can include one or more compute resources 908, one or more memory resources 910, and one or more other resources 912. The compute resource(s) 906 can include one or more hardware components that can perform computations to process data, and/or to execute computer-executable instructions of one or more application programs, operating systems, services, and/or other software including, but not limited to, the transaction validation application 108, the transaction validation service 110, and/or the application 114 illustrated and described herein.

According to various embodiments, the compute resources 908 can include one or more central processing units ("CPUs"). The CPUs can be configured with one or more processing cores. In some embodiments, the compute resources 908 can include one or more graphics processing units ("GPUs"). The GPUs can be configured to accelerate operations performed by one or more CPUs, and/or to perform computations to process data, and/or to execute computer-executable instructions of one or more application programs, operating systems, and/or other software that may or may not include instructions that are specifically graphics computations and/or related to graphics computations. In some embodiments, the compute resources 908 can include one or more discrete GPUs. In some other embodiments, the compute resources 908 can include one or more CPU and/or GPU components that can be configured in accordance with a co-processing CPU/GPU computing model. Thus, it can be appreciated that in some embodiments of the compute resources 908, a sequential part of an application can execute on a CPU and a computationally-intensive part of the application can be accelerated by the GPU. It should be understood that this example is illustrative, and therefore should not be construed as being limiting in any way.

In some embodiments, the compute resources 908 also can include one or more system on a chip ("SoC") components. It should be understood that an SoC component can operate in association with one or more other components as illustrated and described herein, for example, one or more of the memory resources 910 and/or one or more of the other resources 912. In some embodiments in which an SoC component is included, the compute resources 908 can be or can include one or more embodiments of the SNAPDRAGON brand family of SoCs, available from QUALCOMM of San Diego, Calif.; one or more embodiment of the TEGRA brand family of SoCs, available from NVIDIA of Santa Clara, Calif.; one or more embodiment of the HUMMINGBIRD brand family of SoCs, available from SAMSUNG of Seoul, South Korea; one or more embodiment of the Open Multimedia Application Platform ("OMAP") family of SoCs, available from TEXAS INSTRUMENTS of Dallas, Tex.; one or more customized versions of any of the above SoCs; and/or one or more other brand and/or one or more proprietary SoCs.

The compute resources 908 can be or can include one or more hardware components that can be arranged in accordance with an ARM architecture, available for license from ARM HOLDINGS of Cambridge, United Kingdom. Alternatively, the compute resources 908 can be or can include one or more hardware components that can be arranged in accordance with an x86 architecture, such as an architecture available from INTEL CORPORATION of Mountain View, Calif., and others. Those skilled in the art will appreciate the implementation of the compute resources 908 can utilize various computation architectures and/or processing architectures. As such, the various example embodiments of the compute resources 908 as mentioned hereinabove should not be construed as being limiting in any way. Rather, implementations of embodiments of the concepts and technologies disclosed herein can be implemented using compute resources 908 having any of the particular computation architecture and/or combination of computation architectures mentioned herein as well as other architectures.

Although not separately illustrated in FIG. 9, it should be understood that the compute resources 908 illustrated and described herein can host and/or execute various services, applications, portals, and/or other functionality illustrated and described herein. Thus, the compute resources 908 can host and/or can execute the transaction validation application 108, the transaction validation service 110, the application 114, or other applications or services illustrated and described herein.

The memory resource(s) 910 can include one or more hardware components that can perform or provide storage operations, including temporary and/or permanent storage operations. In some embodiments, the memory resource(s) 910 can include volatile and/or non-volatile memory implemented in any method or technology for storage of information such as computer-readable instructions, data structures, program modules, or other data disclosed herein. Computer storage media is defined hereinabove and therefore should be understood as including, in various embodiments, random access memory ("RAM"), read-only memory ("ROM"), Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium that can be used to store data and that can be accessed by the compute resources 908, subject to the definition of "computer storage media" provided above (e.g., as excluding waves and signals per se and/or communication media as defined in this application).

Although not illustrated in FIG. 9, it should be understood that the memory resources 910 can host or store the various data illustrated and described herein including, but not limited to, transaction data 118 (e.g., one or more portions thereof such as the transaction request 122, the first hash 124, and/or the other information); the application data 126 (e.g., one or more portions thereof such as the first hash 124, the application request 128, the application decision 130, and/or the other information); the validation data 132 (e.g., one or more portions thereof such as the validation request 134, the validation decision 136, the second hash 138, and/or the other information); and/or other data, if desired. It should be understood that this example is illustrative, and therefore should not be construed as being limiting in any way.

The other resource(s) 912 can include any other hardware resources that can be utilized by the compute resources(s) 906 and/or the memory resource(s) 910 to perform operations. The other resource(s) 912 can include one or more input and/or output processors (e.g., a network interface controller and/or a wireless radio), one or more modems, one or more codec chipsets, one or more pipeline processors, one or more fast Fourier transform ("FFT") processors, one or more digital signal processors ("DSPs"), one or more speech synthesizers, combinations thereof, or the like.

The hardware resources operating within the hardware resource layer 902 can be virtualized by one or more virtual machine monitors ("VMMs") 914A-914N (also known as "hypervisors;" hereinafter "VMMs 914"). The VMMs 914 can operate within the virtualization/control layer 904 to manage one or more virtual resources that can reside in the virtual resource layer 906. The VMMs 914 can be or can include software, firmware, and/or hardware that alone or in combination with other software, firmware, and/or hardware, can manage one or more virtual resources operating within the virtual resource layer 906.

The virtual resources operating within the virtual resource layer 906 can include abstractions of at least a portion of the compute resources 908, the memory resources 910, the other resources 912, or any combination thereof. These abstractions are referred to herein as virtual machines ("VMs"). In the illustrated embodiment, the virtual resource layer 906 includes VMs 916A-916N (hereinafter "VMs 916").

Based on the foregoing, it should be appreciated that systems and methods for providing a transaction validation service have been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

The invention claimed is:

1. A system comprising:
a processor; and
a memory that stores computer-executable instructions that, when executed by the processor, cause the processor to perform operations comprising
receiving, via a first communication channel and from an application server that hosts an application, a request to validate a transaction that was requested by a user device that communicates with the application server via a second communication channel, wherein the transaction is performed by the application based on transaction-specific information sent by the user device to the application server via the second communication channel, wherein the request to validate the transaction is obtained from the application server and via the first communication channel with a first hash that is created by the user device and provided to the application server via the second communication channel, and wherein the first hash comprises a hash of the transaction-specific information that is hashed by the user device using data stored on the user device,
obtaining, from the user device and via a third communication channel, a second hash that is created by the user device, wherein the second hash comprises a second hash of the transaction-specific information, wherein the second hash is hashed by the user device using the data stored on the user device,
determining, based on the first hash and the second hash, whether the transaction should be allowed or blocked, wherein the transaction is allowed if the first hash matches the second hash, and wherein the transaction is blocked if the first hash does not match the second hash, and
sending, to the application server via the first communication channel, an application decision based on the determining, wherein the application decision indicates if the application is to allow or block the transaction.

2. The system of claim 1, wherein the data stored on the user device comprises a private key that is stored in a subscriber identity module of the user device.

3. The system of claim 1, wherein the data stored on the user device comprises a hash algorithm that is stored in a subscriber identity module of the user device.

4. The system of claim 1, wherein obtaining the second hash comprises requesting the second hash from the user device in response to receiving an indication that the transaction has been approved, and wherein the user device requires a successful biometric authentication at the user device before creating the second hash.

5. The system of claim 1, wherein the computer-executable instructions, when executed by the processor, cause the processor to perform operations further comprising:
receiving, from the user device, an indication that the transaction has been approved, wherein receiving the indication comprises
sending, to the user device and via the third communication channel, a validation request comprising a request that the user device validate the transaction, and
receiving, from the user device and via the third communication channel, a validation response comprising the indication that the transaction has been approved.

6. The system of claim 1, wherein the transaction comprises requesting sending of an email message via an email service, and wherein the transaction-specific information comprises an email address of a recipient of the email message.

7. The system of claim 1, wherein the transaction comprises requesting a transfer or payment via a banking service, and wherein the transaction-specific information comprises an amount associated with the transfer or payment.

8. A method comprising:
receiving, at a device comprising a processor and from an application server via a first communication channel, a request to validate a transaction that was requested by a user device that communicates with the application server via a second communication channel, and wherein the transaction is performed by an application hosted by the application server based on transaction-specific information sent by the user device to the application server via the second communication channel, wherein the request to validate the transaction is obtained from the application server and via the first communication channel with a first hash that is created by the user device and provided to the application server via the second communication channel, and wherein the first hash comprises a hash of the transaction-specific information that is hashed by the user device using data stored on the user device;
obtaining, by the processor, via a third communication channel, and from the user device, a second hash that is created by the user device, wherein the second hash comprises a second hash of the transaction-specific information, wherein the second hash is hashed by the user device using the data stored on the user device;
determining, by the processor and based on the first hash and the second hash, whether the transaction should be allowed or blocked, wherein the transaction is allowed if the first hash matches the second hash, and wherein the transaction is blocked if the first hash does not match the second hash; and
sending, to the application server via the first communication channel, an application decision based on the determining, wherein the application decision indicates if the application is to allow or block the transaction.

9. The method of claim 8, wherein the data stored on the user device comprises a private key that is stored in a subscriber identity module of the user device.

10. The method of claim 8, wherein the data stored on the user device comprises a hash algorithm that is stored in a subscriber identity module of the user device.

11. The method of claim 8, wherein obtaining the second hash comprises requesting the second hash from the user device in response to receiving an indication that the transaction has been approved, and wherein the user device requires a successful biometric authentication at the user device before creating the second hash.

12. The method of claim 8, wherein the transaction comprises sending an email message via an email service, and wherein the transaction-specific information comprises an email address of a recipient of the email message.

13. The method of claim 8, further comprising receiving, from the user device, an indication that the transaction has been approved, wherein receiving the indication comprises:
sending, to the user device and via the third communication channel, a validation request comprising a request that the user device validate the transaction; and
receiving, from the user device and via the third communication channel, a validation response comprising the indication that the transaction has been approved.

14. The method of claim 8, wherein the transaction comprises requesting a transfer or payment via a banking service, and wherein the transaction-specific information comprises an amount associated with the transfer or payment.

15. A computer storage medium having computer-executable instructions stored thereon that, when executed by a processor, cause the processor to perform operations comprising:
receiving, via a first communication channel and from an application server that hosts an application, a request to validate a transaction that was requested by a user device that communicates with the application server via a second communication channel, wherein the transaction is performed by the application based on transaction-specific information sent by the user device to the application server via the second communication channel, wherein the request to validate the transaction is obtained from the application server and via the first communication channel with a first hash that is created by the user device and provided to the application server via the second communication channel, and wherein the first hash comprises a hash of the transaction-specific information that is hashed by the user device using data stored on the user device;
obtaining, from the user device and via a third communication channel, a second hash that is created by the user device, wherein the second hash comprises a second hash of the transaction-specific information, wherein the second hash is hashed by the user device using the data stored on the user device;
determining, based on the first hash and the second hash, whether the transaction should be allowed or blocked, wherein the transaction is allowed if the first hash matches the second hash, and wherein the transaction is blocked if the first hash does not match the second hash; and
sending, to the application server via the first communication channel, an application decision based on the determining, wherein the application decision indicates if the application is to allow or block the transaction.

16. The computer storage medium of claim 15, wherein the data stored on the user device comprises a private key that is stored in a subscriber identity module of the user device.

17. The computer storage medium of claim 15, wherein the data stored on the user device comprises a hash algorithm that is stored in a subscriber identity module of the user device.

18. The computer storage medium of claim 15, wherein the computer-executable instructions, when executed by the processor, cause the processor to perform operations further comprising:
receiving, from the user device, an indication that the transaction has been approved, wherein receiving the indication comprises
sending, to the user device and via the third communication channel, a validation request comprising a request that the user device validate the transaction, and
receiving, from the user device and via the third communication channel, a validation response comprising the indication that the transaction has been approved.

19. The computer storage medium of claim 15, wherein the transaction comprises requesting sending of an email message via an email service, and wherein the transaction-specific information comprises an email address of a recipient of the email message.

20. The computer storage medium of claim 15, wherein the transaction comprises requesting a transfer or payment via a banking service, and wherein the transaction-specific information comprises an amount associated with the transfer or payment.

* * * * *